US012789787B2

(12) United States Patent
Dasher et al.

(10) Patent No.: US 12,789,787 B2
(45) Date of Patent: Nov. 10, 2026

(54) SYSTEM AND METHODS FOR VEHICLE PARKING ASSISTANCE AND SAFETY

(71) Applicant: Adeia Guides Inc., San Jose, CA (US)

(72) Inventors: Charles Dasher, Lawrenceville, GA (US); Reda Harb, Tampa, FL (US); Evgeny Kaminsky, Hallandale Beach, FL (US); Christopher Phillips, Hartwell, GA (US)

(73) Assignee: ADEIA GUIDES INC., San Jose, CA (US)

( * ) Notice: Subject to any disclaimer, the term of this patent is extended or adjusted under 35 U.S.C. 154(b) by 457 days.

(21) Appl. No.: 18/426,558

(22) Filed: Jan. 30, 2024

(65) Prior Publication Data

US 2025/0242798 A1 Jul. 31, 2025

(51) Int. Cl.
*B60W 30/06* (2006.01)

(52) U.S. Cl.
CPC ....... *B60W 30/06* (2013.01); *B60W 2540/043* (2020.02); *B60W 2540/215* (2020.02); *B60W 2554/801* (2020.02)

(58) Field of Classification Search
CPC ... B62D 15/0285; B60W 10/20; B60W 30/06; B60W 2540/215; B60W 2554/801; B60W 2540/043
See application file for complete search history.

(56) References Cited

U.S. PATENT DOCUMENTS

| | | | | |
|---|---|---|---|---|
| 10,384,718 | B1 * | 8/2019 | Kentley-Klay | B60Q 1/48 |
| 10,513,292 | B2 | 12/2019 | Mayer et al. | |
| 10,625,733 | B2 * | 4/2020 | Cheaz | B60W 10/18 |
| 11,338,826 | B2 | 5/2022 | Hara et al. | |
| 11,527,079 | B2 | 12/2022 | Vallance et al. | |
| 2005/0285758 | A1 | 12/2005 | Matsukawa et al. | |
| 2017/0043766 | A1 * | 2/2017 | Ha | B60W 10/04 |
| 2019/0286135 | A1 * | 9/2019 | Yasuda | B60W 30/06 |
| 2020/0005649 | A1 * | 1/2020 | Kim | B60Q 9/005 |
| 2020/0298837 | A1 * | 9/2020 | Noguchi | B60W 50/0205 |
| 2020/0307559 | A1 * | 10/2020 | Göricke | G08G 1/168 |
| 2020/0384984 | A1 * | 12/2020 | Murray | B60W 50/14 |
| 2021/0070282 | A1 * | 3/2021 | Kim | B60W 30/06 |

(Continued)

OTHER PUBLICATIONS

Tesla's 2019 Model 3 owner's manual. Published Dec. 20, 2018 https://tesla-info.com/doc/m3/model_3_owners_manual_north_america_en_2019_0.pdf.

*Primary Examiner* — Peter D Nolan
*Assistant Examiner* — Ce Li Li
(74) *Attorney, Agent, or Firm* — HG LAW LLP

(57) ABSTRACT

Embodiments herein provide a system and methods for parking a vehicle that considers the location of adjacent vehicles and determines parking maneuvers to allow easy access to the vehicle. The parking maneuvers are determined based on the space needed for each passenger to open their door and to safely exit or enter the vehicle. The vehicle may be positioned in a parking spot next to an adjacent vehicle. The system self-drives the vehicle when executing the parking maneuvers and sensors are used to determine the position of the vehicle in relation to the adjacent vehicle. The vehicle may be positioned such that passengers can safely exit the vehicle while in the parking spot. Once the passengers exit and are safely away, the vehicle is maneuvered within the parking spot to a position that does not impede access to the adjacent vehicle.

20 Claims, 24 Drawing Sheets

(56) References Cited

U.S. PATENT DOCUMENTS

| | | | | |
|---|---|---|---|---|
| 2021/0101586 | A1* | 4/2021 | Woo | B62D 15/0285 |
| 2022/0073056 | A1* | 3/2022 | Hüger | B60W 30/06 |
| 2023/0159021 | A1 | 5/2023 | Murayama | |
| 2024/0227784 | A9* | 7/2024 | DiGioacchino | B60W 50/14 |
| 2024/0286601 | A1* | 8/2024 | Dudar | B60W 30/06 |
| 2025/0196683 | A1* | 6/2025 | Lee | B60L 53/36 |
| 2025/0242824 | A1* | 7/2025 | Ko | G08G 1/168 |

* cited by examiner

840A

842 Identify whether to back the vehicle into the parking spot

844 Determine trajectory to position the vehicle in the parking spot such that passengers can exit the right side of the vehicle 846 Vehicle self-drives, rear first, along trajectory into parking spot 848 Monitor for exit of passengers

840C

862

Identify adjacent parking spot is not occupied

864

Vehicle self-drives into parking spot such that rear of vehicle is in front of parking spot

866

Monitor for exit of passengers

868

Vehicle self-drives to a position such that front of vehicle is in front of parking spot and the vehicle becomes centered in the parking spot

SYSTEM AND METHODS FOR VEHICLE PARKING ASSISTANCE AND SAFETY

BACKGROUND

This disclosure is directed to systems and methods for allowing passengers to safely access a vehicle parked in a small parking spot.

SUMMARY

As vehicles become larger and parking spots smaller, it may be difficult to find an adequately sized parking spot. In some scenarios, other vehicles may be parked on or immediately next to opposing lines of an available parking spot. Once a vehicle is parked, passengers on either side of the vehicle may not have enough room to open their doors to exit or enter the vehicle. The problem is even more apparent when passengers need additional clearance to access the vehicle, such as when a passenger has a disability or needs to access a child in a car seat. To solve this, some passengers may be dropped off right before the vehicle is parked in a congested or small parking spot, which has limited room to access the vehicle. However, this may increase the risk of harm since the passengers may need to walk in an active driving lane of a parking lot. Dropping some passengers off at a drop-off location before parking may decrease the risk to the passengers. However, after parking in the small parking spot, the driver of the vehicle may need to carefully open the door and slip through the narrow gap of the door. If the driver parks the vehicle close to a vehicle on the passenger side, the driver has more space to exit but access to the vehicle on the passenger side is restricted and may result in a scratch or dent on the driver's vehicle or the vehicle on the passenger side. Thus, a system and method are needed to allow a self-driving vehicle to operate in a mode that allows for parking in a small parking spot while allowing each passenger to safely access the vehicle and does not impede access to adjacent vehicles.

In one approach, a parking assistance system may help a driver find an available parking spot. Such systems may use sensors embedded in the ground underneath each parking spot or cameras to visually detect whether a vehicle is in each parking spot. The system may direct the driver to an available parking spot. However, such systems may not account for the size of the parking spot, how close vehicles parked in adjacent parking spots are to the bounds of the parking spot, or the size of the vehicle of the driver. Since the system does not account for spatial constraints specific to the driver's vehicle, the system may not be able to direct the driver to a parking spot where passengers can safely access the vehicle. Further, the system does not provide a solution to the problem of parking in a small parking spot.

In another approach, a vehicle may have a parking assistance system. Such systems include basic systems, which provide guidance and alerts to drivers, to fully autonomous systems capable of parking the vehicle without driver intervention. A fully autonomous system may position the vehicle close to a curb or parking barrier or may center the vehicle between adjacent parked vehicles. However, the system may overlook how the positioning of the adjacent parked vehicles can impact the ability of passengers to safely and comfortably access the vehicle. Such systems may not account for the room each passenger needs to open or close their door. Thus, parking assistance systems may not provide a means for parking in a small parking spot that allows each passenger to safely access the vehicle. Such systems may also fail to account for the space needed to access the adjacent vehicles.

Accordingly, there is a need to provide a system that automatically parks a vehicle in such a way to allow each passenger to safely access the vehicle while not impeding access to adjacent vehicles. Such a solution leverages the ability to detect the space available in a parking spot, determine the space needed for passengers to access the vehicle, and self-drive the vehicle into and out of the parking spot.

To solve these problems, systems and methods are provided herein for operating a self-driving vehicle to allow parking a vehicle in a small parking spot while allowing passengers to safely access the vehicle.

In one approach, a system is provided for parking a vehicle that evaluates the spatial arrangement of adjacent vehicles and determines parking maneuvers to allow easy access and efficient parking spot utilization. The parking maneuvers are determined based on the space needed for each passenger to open their door and to safely exit or enter (collectively referred to as "access") the vehicle. In some embodiments, the system performs the maneuvers after receiving a request to initiate parking in an easy access mode. The system may identify an available parking spot through user input, input from another system, or sensors of the vehicle. The available parking spot may be next to a parking spot containing an adjacent vehicle. The system self-drives the vehicle when executing the parking maneuvers and uses the sensors to determine the position of the vehicle in relation to the adjacent vehicle. The vehicle is positioned in the parking spot such that passengers can safely access the vehicle. Once the system detects that the passengers exited and are safely away, the vehicle is maneuvered within the parking spot to a position that does not impede access to the adjacent vehicle.

In some embodiments, the system uses the sensors to automatically determine and execute the parking maneuvers. Such automatic decisions may reduce the burden on a user of the system. In some embodiments, the system receives user input to confirm determinations made using the sensors. Such confirmations may be used to mitigate any risk associated with sensor errors.

In another approach, the system determines which parking maneuvers to perform based on different states or sub-modes. In some examples, the easy access mode operates in an "arrival" state when performing parking maneuvers to position the vehicle to allow a user to exit the vehicle and to autonomously park the vehicle. When the system receives input indicating that the user will enter the vehicle, the easy access mode may operate in a "departure" state. In some embodiments, while in the departure state, the system performs the parking maneuvers of the arrival state in a reversed sequence such that the vehicle self-drives from the parked position to the position from which the user exited the vehicle. The passengers may then safely enter the vehicle while the vehicle is in the parking spot. After loading in the departure state of the easy access mode, the vehicle may self-drive to exit the parking spot. In some embodiments, while in the departure state, the system evaluates its surroundings using the sensors to determine if the different vehicle has moved, or if other vehicles are present in adjacent parking spots. The system updates the parking maneuvers to account for changes in the surroundings. In some embodiments, the system determines whether the easy access mode operates in the arrival or departure state based on a navigation request. In some implementations, a destination is input into a navigational system of the vehicle. In one example, the system receives the destination and current location of the vehicle to determine the easy access mode will operate in the arrival state prior to arriving at the destination and in the departure state when leaving the destination.

In some embodiments, the system may determine the state of the easy access mode based on user input. In some embodiments, the system may use position information to determine the state. For example, the system may use a position of the vehicle to determine the vehicle is in a parking lot and to initiate the arrival state of the easy access mode. The system may use a position of a passenger to determine the passenger is returning to the vehicle and to initiate the departure state.

In another approach, the system communicates with other vehicles. In one example, the system notifies nearby vehicles when the easy access mode is active. In another example, the system determines if a nearby vehicle is planning to execute a maneuver that may affect parking. In some embodiments, the system pauses or refrains from operating or maneuvering until the nearby vehicle completes its maneuvers. In some embodiments, the nearby vehicle may pause or refrain from maneuvering until the vehicle finishes its parking maneuvers. In some embodiments, the system communicates with a vehicle parked in an adjacent parking spot to modify at least a subset of security features while the vehicle performs its parking maneuvers. Modifying the security features prevents unnecessary triggering of alarms or notifications. Communicating with other vehicles allows the vehicle to safely perform parking maneuvers without colliding with the other vehicles, and allows passengers to safely access the vehicle by alerting the other vehicles that the passengers are present.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
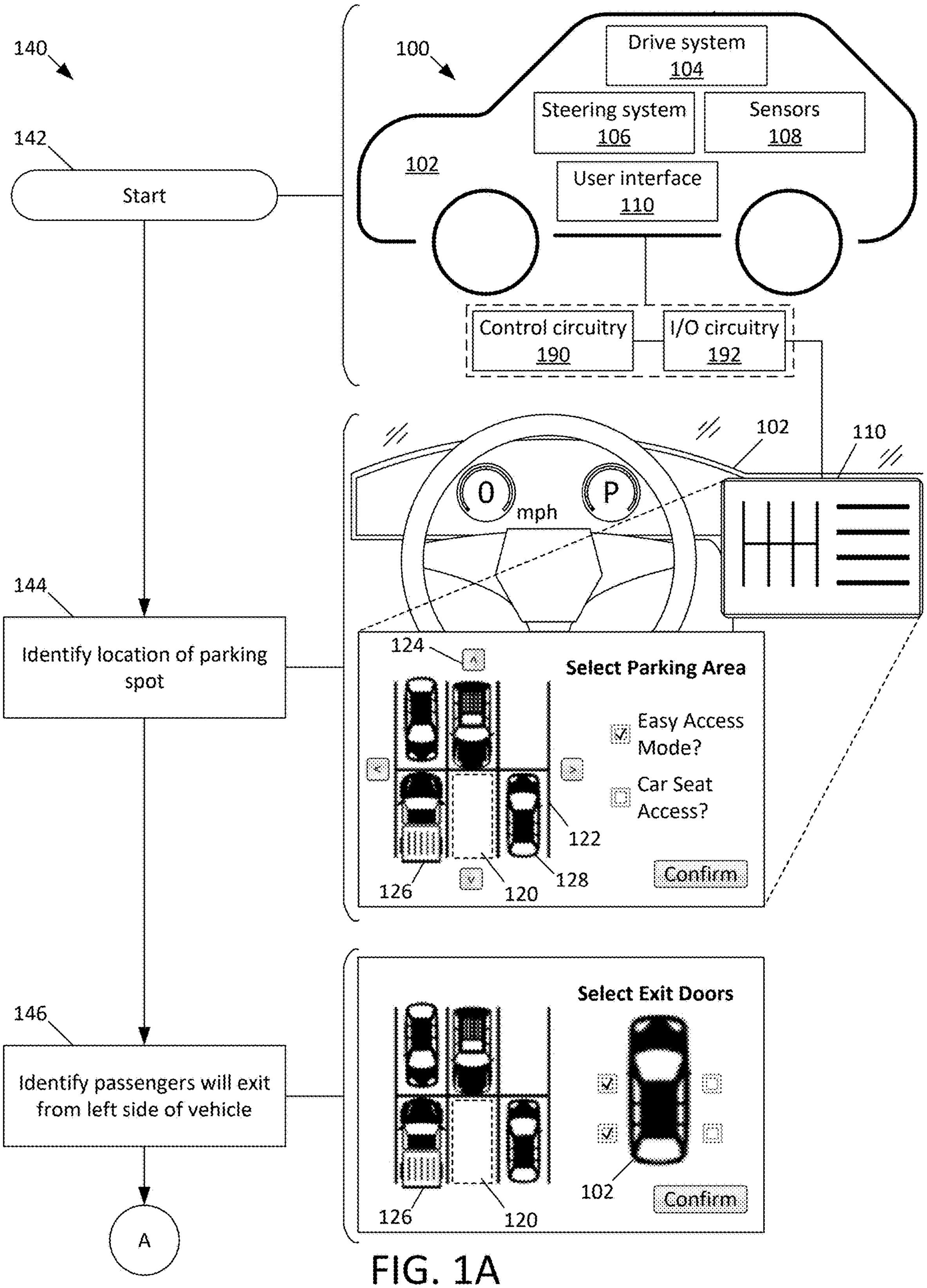
FIGS. 1A-1C are schematic illustrations of a process for using a system to position a vehicle during parking to allow passengers to safely exit the vehicle, in accordance with embodiments of the disclosure.
Figure 1B:
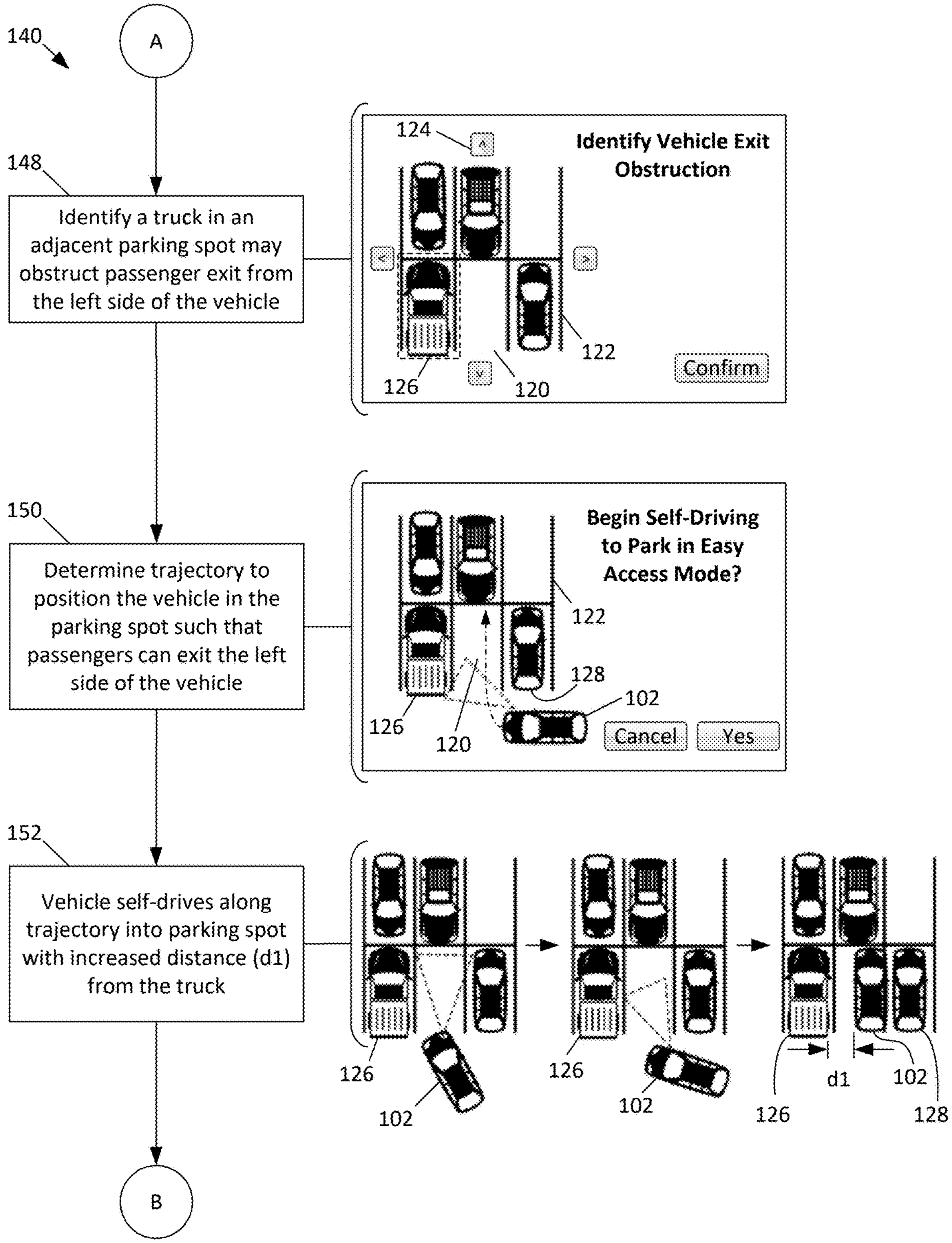
Figure 1C:
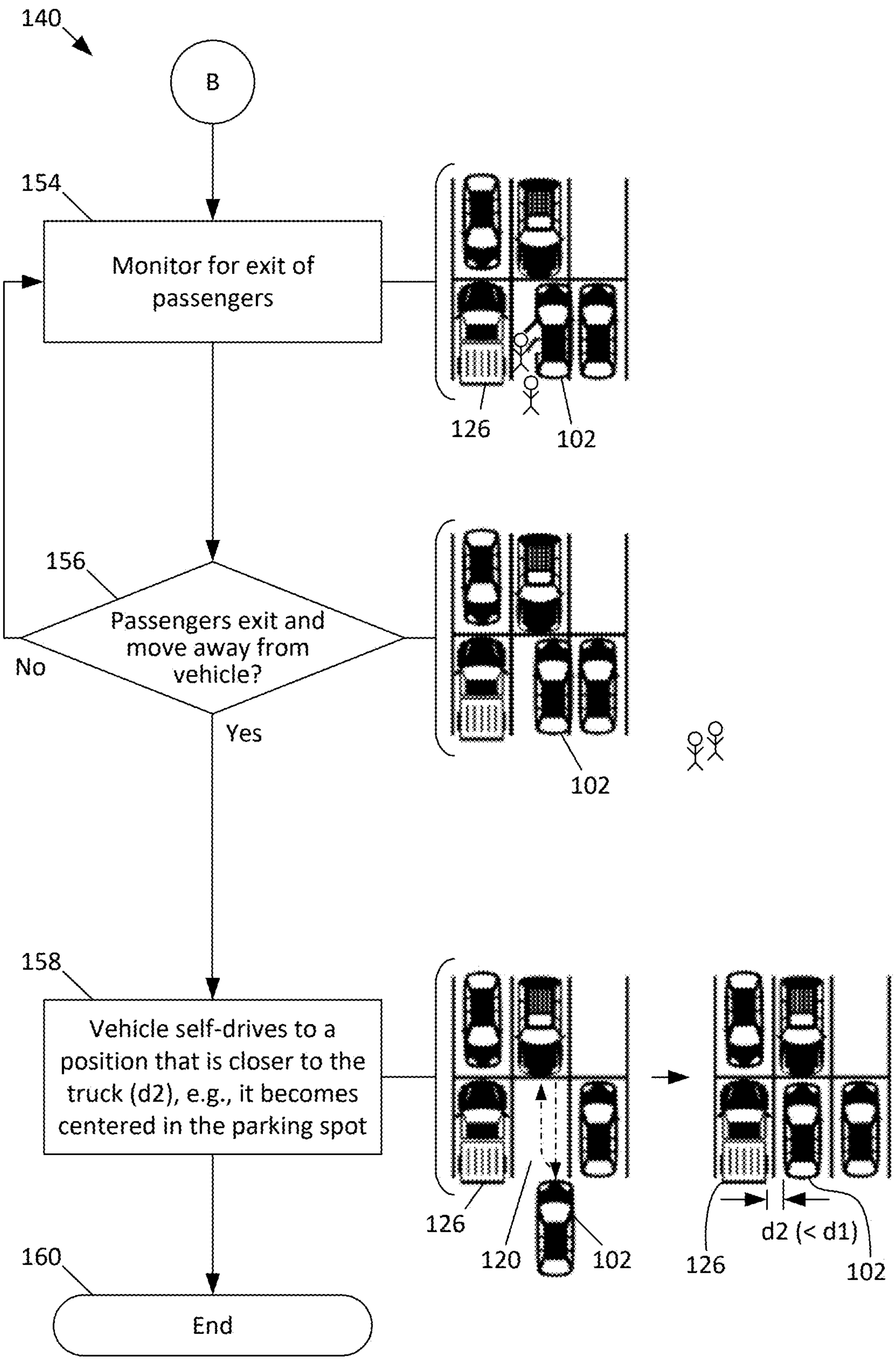

FIGS. 1A-1C are schematic illustrations of a process 140 for using a system 100 to position a vehicle 102 during parking to allow passengers to safely exit the vehicle 102, in accordance with embodiments of the disclosure.

Referring to FIG. 1A, the process 140 starts at operation 142 with control circuitry 190 (or, e.g., control circuitry 1612, discussed below in relation to FIG. 16) initializing the system 100. In some embodiments, the control circuitry 190 executes the system 100, which includes at least one sensor 108, the control circuitry 190, and input/output (I/O) circuitry 192 (or, e.g., I/O path 1616, discussed below in relation to FIG. 16). The I/O circuitry 192 receives input from the sensors 108. The vehicle 102 includes a drive system 104 (or, e.g., drive system 1620, discussed below in relation to FIG. 16), steering system 106 (or, e.g., steering system 1622, discussed below in relation to FIG. 16), the sensors 108 (or, e.g., sensors 1608, discussed below in relation to FIG. 16), and a user interface 110 (depicted as a display system of the vehicle 102) and is capable of performing a parking maneuver in an automated or autonomous way.

In some embodiments, the drive system 104 includes systems to accelerate and decelerate the vehicle 102. The drive system 104 includes a drive machine for accelerating the vehicle 102. In some embodiments, the drive machine includes an engine, such as a gasoline engine. In some embodiments, the drive machine includes a motor, such as an electric motor. In some embodiments, the drive system 104 includes multiple drive machines, such as a drive machine for each wheel set (e.g., front set and rear set) or a drive machine for each wheel. The drive system 104 also includes a braking system to decelerate the vehicle 102. The braking system may include any one of disc brakes, drum brakes, anti-lock braking system, electronic brake-force distribution system, regenerative braking, or handbrakes. The drive system 104 also includes any systems that interface with or support the drive machine of braking system, such as a transmission, accelerator and brake pedals, or battery system (e.g., any of a battery, battery charger, inverter, and battery system controller), to name a few examples.

In some embodiments, the steering system 106 includes systems to steer the vehicle 102 or control the orientation of the vehicle 102 or the direction the vehicle 102 is heading. In some embodiments, the steering system includes any of a steering wheel, steering column, steering gear or rack, and tie rods that are coupled to steerable wheels of the vehicle 102. In some embodiments, the steering system 106 includes a drive machine coupled to a wheel of each side of the vehicle 102. In such embodiments, the drive machine applies positive or negative torques to the wheels to turn the vehicle 102 in addition to or instead of turning the wheels.

In some embodiments, the sensors 108 sense various conditions about the environment surrounding the vehicle 102. For example, the sensors 108 may be used for any one of detecting nearby objects (e.g., another vehicle or a person), to determining a proximity of the nearby objects to the vehicle 102, or tracking motion of the nearby objects in relation to the vehicle 102. The sensors 108 may include any one or combination of ultrasonic sensors, cameras, radar, lidar, or any other sensors capable of detecting the presence of parking spots, parked vehicles, or detecting the proximity of the vehicle 102 to a parking lot. In some embodiments, the sensors 108 enable the drive and steering systems 104, 106 to navigate the surrounding environment and to position the vehicle 102 within a parking spot 120 (also referred to as a parking space or parking area).

In some embodiments, the sensors 108 sense conditions about the environment inside the vehicle 102. In such embodiments, the sensors 108 include occupancy sensors to sense whether a passenger is present in each seat of the vehicle 102. The occupancy sensors 108 may include any one or combination of passive infrared sensors (PIR), ultrasonic sensors, cameras, pressure or weight sensors, and seat buckle sensors, to name a few examples.

In some embodiments, the user interface 110 includes systems (e.g. user input interface 1602, discussed below in relation to FIG. 16) to accept input from a user (e.g., a passenger of the vehicle 102, such as the driver). In the embodiment depicted in FIG. 1A, the user interface 110 includes a display screen (e.g., a touch screen display) located within the vehicle 102. The user interface 110 receives input commands or preferences or selection of options from a user. In some embodiments, the user interface 110 includes a user device, such as wireless user communications device 1722 discussed below in relation to FIG. 17. In one example, the user device runs an application to accept input from the user and to communicate with the control circuitry 190. The control circuitry 190 communicates with the user device through the I/O circuitry 192.

In some embodiments, a data source (e.g., vehicle element control application data source 1704, discussed below in relation to FIG. 17) provides the input data from the sensors 108 to the control circuitry 190. In one example, the user interface 110 provides an input from the user to the control circuitry 190. The control circuitry 190 processes the inputs and sends a command to perform an action to control the drive and steering systems 104, 106 (e.g., drive and steering systems 1620, 1622, discussed below in relation to FIG. 16). In some embodiments, the control circuitry 190 interfaces with vehicle control circuitry to perform the action. In some embodiments, the I/O circuitry 192 receives the command to perform the action from the control circuitry 190 and interfaces with the vehicle control circuitry.

In some embodiments, the control circuitry 190 resides in or on the vehicle 102. The system 100 includes several applications to control the vehicle 102 based on the inputs. For example, the control circuitry 190, by running the system 100, processes computer-executable instructions to analyze the input from the sensors 108 and/or the user interface 110 to identify the action to control the vehicle 102. In one example, the applications are stored in a non-transitory memory (e.g., storage 1614, discussed below in relation to FIG. 16). In some implementations, instructions for the applications are stored in the non-transitory memory, and when executed, perform the operations of the process 140. The control circuitry 190 includes processing circuitry (e.g., processing circuitry 1610, discussed below in relation to FIG. 16) to process input to the control circuitry 190 (e.g., data and computer-executable instructions), store data to the non-transitory memory, and output results. In some implementations, the system 100 includes a computer (e.g., vehicle computer equipment 1716, discussed below in relation to FIG. 17) having the non-transitory memory with non-transitory instructions, that when executed, cause the execution of the applications. In one example, the control circuitry 190 and I/O circuitry 192 are part of the computer having the non-transitory memory.

In some embodiments, the instructions are provided by the control circuitry 190 through the I/O circuitry 192. A vehicle element control application executes on the control circuitry 190, such as discussed below in relation to FIGS. 16 and 17, to provide instructions to the control circuitry 190 to perform the operations of process 140. The control circuitry 190 also executes a vehicle interface application, such as discussed below in relation to FIGS. 16 and 17, to communicate with the sensors 108, the user interface 110, and/or a user device through the I/O circuitry 192. The control circuitry 190 also executes a vehicle communications application to transmit information to, receive information from, and process information associated with communications with other vehicles. In some embodiments, the vehicle interface application interfaces with the other applications to carry out its functions. In embodiments, the control circuitry 190 executes the vehicle interface application to communicate with the user device (e.g., of a passenger of the vehicle 102 or a passenger of another vehicle). The control circuitry 190 is capable of sending and receiving communications over a communications network (e.g., communications network 1214, 1710, discussed below in relation to FIGS. 12 and 17) to communicate with the sensors 108, the user interface 110, the user device, and other vehicles, to name a few examples. In some embodiments, the control circuitry 190 communicates with a server and at least part of at least one of the applications runs on a server, such as discussed in relation to FIG. 17. In some implementations, the instructions for the applications are stored on the server.

The process 140 continues to operation 144 with the control circuitry 190 identifying a location of a parking spot 120. In the embodiment depicted in FIG. 1A, the vehicle 102 is shown at a stand-still (e.g., 0 mph) and in park. The parking spot 120 is presented to the user through a graphical user interface (GUI) on the display screen of the user interface 110. The GUI displays a parking lot 122 on its left side and parking options on its right side. The parking lot 122 has vehicles parked in some of its parking spaces. The parking options inform the user to select a parking area. Four arrow keys 124 are shown on the top, bottom, left, and right of the parking lot 122. The parking spot 120 is highlighted with a dashed rectangle. The arrow keys 124 may be used to move the dashed rectangle in relation to the parking lot 122 to adjust the location of the parking spot 120. The control circuitry 190 receives any updates to the location of the parking spot 120. The parking spot 120 has a truck 126 on its left side and a car 128 on its right side.

The parking options include selection boxes for an "easy access mode" and a "car seat access" option. In the example shown in FIG. 1A, the easy access mode is selected and the car seat access is not selected. The user may select a "confirm" button to confirm the selections and proceed to the next GUI. In some embodiments, the control circuitry identifies the parking spot 120 before the easy park mode is enabled or without enabling the easy park mode.

With the easy access mode enabled, the process 140 continues to operation 146 with the control circuitry 190 identifying that passengers will exit from the left side of the vehicle 102. In the embodiment shown in FIG. 1A, the parking lot 122 and parking spot 120 are shown on the left side of a GUI and an illustrative vehicle 102 is shown on the right side. A selection box is presented next to each door of the illustrative vehicle 102 to allow the user to select which doors passengers will exit. The user may select a "confirm" button to confirm the exit doors and proceed to the next GUI.

In some embodiments, the selection boxes are pre-populated based on data received from the sensors 108. In one example, the user confirms the pre-populated selections or alters them before proceeding.

Referring to FIG. 1B, the process 140 continues to operation 148 with the control circuitry 190 identifying the truck 126 in the adjacent left parking spot may obstruct passengers from exiting the left side of the vehicle 102. A GUI shows the parking lot 122 on its left side and an option to confirm whether the truck 126 in the adjacent parking spot (shown as highlighted by a dashed line) is on the side that passengers will exit. Arrow keys 124 surround the parking lot 122 and may be used to adjust the location of the adjacent parking spot, which are received by the control circuitry 190. The user may select a "confirm" button to confirm the adjacent parking spot and proceed to the next GUI. In some embodiments, the GUI is used to select and confirm the car 128 is an adjacent vehicle.

The process 140 continues to operation 150 with the control circuitry 190 determining a trajectory needed to position the vehicle 102 in the parking spot 120. The trajectory is determined to position the vehicle 102 such that passengers have enough space to open the left side doors and exit the vehicle 102. A GUI shows the parking lot 122 on its left side and an option to begin self-driving to park in easy access mode on its right side. The vehicle 102 is shown outside of the parking spot 120 and perpendicular to the truck 126. The trajectory is shown as a dashed-dotted line extending from the vehicle 102 into the parking spot 120. A dashed shape (shown as a triangle) notes an area scanned using the sensors 108 (FIG. 1A) of the vehicle 102. The user may select a "confirm" button to confirm the trajectory is correct and to begin execution of the easy access mode or select a "cancel" button to exit the easy access mode.

The process 140 continues to operation 152 with the control circuitry 190 automatically driving the vehicle 102 along the trajectory (e.g., by executing the vehicle element control application) and into the parking spot 120. The control circuitry 190 continues to use the sensors 108 to drive the vehicle 102. For example, the control circuitry 190 uses the sensors 108 to scan the parking spot 120 and determine if further action is needed to assist the vehicle 102 in parking. The trajectory positions the vehicle 102 at an increased distance, shown as first distance d1, from the truck 126 and near or on a parking line of the right side of the parking spot 120.

In some embodiments, the control circuitry 190 initiates automatic driving of vehicle 102 only after the vehicle 102 is at a stand-still or is in park. For example, the GUIs discussed in relation to operations 144-150 are only presented when the vehicle 102 is at a stand-still or in park to prevent distracting the driver of the vehicle 102. In some embodiments, the control circuitry 190 initiates automatic driving of vehicle 102 even if the vehicle 102 is not at a stand-still or is not in park. In one example, the GUIs are displayed while the vehicle 102 is moving or not in park, such as to allow a non-driving passenger to interact with the user interface 110. In another example, the control circuitry initiates automatic driving of the vehicle 102 once the vehicle 102 can safely enter the parking spot 120 and the GUIs discussed in relation to operations 144-150 are not displayed. In such an example, the control circuitry 190 indicates to the user (e.g., through the user interface 110) that it will self-drive or is self-driving the vehicle 102 into the parking spot 120.

In some embodiments, the control circuitry 190 displays the first distance d1 on the user interface 110. In some embodiments, the vehicle 102 is positioned at first the distance d1 from a parking line of the parking spot 120. In some embodiments, the control circuitry 190 drives the vehicle 102 further away from the truck 126 (e.g., further than first distance d1) and past the right-side parking line while maintaining a minimum standoff distance from the car 128 on the right side. In some embodiments, the control circuitry 190 processes the data from the sensors 108 to identify boundaries of the parking spot 120 and positions of nearby vehicles (e.g., truck 126 and car 128). The control circuitry determines the trajectory needed to position the vehicle 102 (e.g., in operation 150) as close as possible to the car 128 based on the identified boundaries and positions. In some embodiments, the control circuitry 190 interfaces with vehicle control circuitry or autopilot control circuitry to direct such control circuitry to drive the vehicle 102.

In some embodiments, the control circuitry 190 determines the first distance d1 based on characteristics of passengers of the vehicle 102 and the adjacent truck 126 and car 128. For example, the control circuitry 190 determines a location of each passenger of the vehicle 102 (e.g., which seats are occupied by passengers) to determine which side of the vehicle 102 the passengers will exit. In some implementations, the control circuitry 190 uses sensor data or user inputs to determine how much distance each passenger will need to exit. Increased distance may be needed to allow larger passengers or passengers having disabilities to exit, or to unload children from car seats or remove items stored in the vehicle 102. In some implementations, the control circuitry 190 uses the sensor data to determine the weight of each passenger. In other implementations, the control circuitry 190 uses the sensor data with facial recognition techniques known in the art to identify each passenger (e.g., by comparing the data to user profiles or known characteristics of people stored in the non-transitory memory). In some embodiments, the weight or identity of each passenger is used to determine the distance needed for each passenger to exit the vehicle 102. For example, if a distance of 2.5 feet is needed to fully open a door of the vehicle 102, then an average-sized passenger may need a distance d1 of at least 2 feet to open the door to access the vehicle 102. A larger person may need the door to be fully open. A smaller person or child may need at least 1.5 feet to open the door. A person unloading a child may need additional clearance between the fully-open door and the adjacent and require a distance d1 of at least 3 feet.

In some implementations, the process 140 provides an additional 1 foot of space to access the vehicle 102. For example, if the parking spot 120 is 9 feet wide and the vehicle 102 is 6 feet wide, parking in the center of the parking spot 120 provides 1.5 feet to open the left doors (or more if the truck 126 is not parked on the left side line of the parking spot 120). Positioning the vehicle 102 a distance of 0.5 feet from the right side line of the parking spot 120 provides 2.5 feet to open the left doors, which is 1 foot more than if the vehicle 102 was centered. In other implementations, the size of the parking spot 120, vehicle 102, and distance of 0.5 feet from the right side line of the parking spot 120 may differ. In one example, the vehicle 102 is positioned on or over the right side line of the parking spot 120 to provide additional space (e.g., more than 2.5 feet, such as more than 3 feet) to open the left doors.

In some embodiments, the control circuitry 190 alerts passengers to avoid exiting on the right side of the vehicle 102. In some examples. the alert is played through speakers of the vehicle 102 (e.g., speakers 1624, discussed below in relation to FIG. 16) or speakers of a user device. In other examples, the alert is displayed on the user interface 110 or a display of a user device. In some embodiments, the control circuitry 190 displays the alert on windows of the vehicle 102 using a heads-up display and techniques known to one skilled in the art. In one example, the alert includes a warning displayed on windows of the right side of the vehicle 102 to not exit the right side and/or an instruction displayed on windows of the left side of the vehicle 102 to exit the left side. In some embodiments, the control circuitry 190 locks the doors on the right side of the vehicle 102 to prevent the passengers from exiting on that side.

Referring to FIG. 1C, the process 140 continues to operation 154 with the control circuitry 190 monitoring for the passengers to exit the left side of the vehicle 102. The process 140 continues to operation 156 with the control circuitry 190 determining if the passengers have exited and moved away from the vehicle 102. In some embodiments, the control circuitry 190 receives an input from the passengers indicating whether they are a safe distance away, such as discussed below in relation to FIGS. 4B and 4C. In some embodiments, the control circuitry 190 receives a location of the passengers, such as from an app on a device (e.g., wireless user communications device 1722, discussed below in relation to FIGS. 16 and 17) of a passenger or from a digital key corresponding to the vehicle 102, to determine whether the passengers are a safe distance away. In some implementations, I/O circuitry 192 receives communications from the devices of the passengers and/or from the sensors 108. The control circuitry 190 executes the vehicle interface application to receive the communications as inputs from the I/O circuitry 192. In some implementations, the passengers are a safe distance away when each passenger is a safety distance away from the vehicle 102. In some examples, the safety distance at least 5 feet away from the vehicle 102, such as at least 10 feet, such as at least 15 feet, such as at least 20 feet. In other examples, the control circuitry 190 determines the safety distance based on a distance of the passengers, motion and movement direction of the passengers, the parking maneuvers to be performed, and the an expected speed at which the parking maneuvers will be performed.

In some embodiments, the control circuitry 190 uses the sensors 108 to determine if the passengers have exited and moved away from the vehicle 102. In some implementations, proximity sensors, such as ultrasonic sensors, radar, or lidar, are used to scan the surroundings of the vehicle 102 and determine if a person is present. In one example, the control circuitry 190 uses the proximity sensors to track movement of any persons present. In some implementations, the control circuitry processes input from a camera to determine if a person is present.

If the determination at operation 156 is no, the process 140 continues to operation 154. If the determination at operation 156 is yes, the process 140 continues to operation 158 with the control circuitry 190 driving the vehicle 102 to position the vehicle 102 at a distance, shown as d2, closer to the truck 126. The distance d2 is less than the first distance d1 (FIG. 1B). In some implementations, the first distance d1 is at least 1.5 feet, such as at least 2 feet, such as at least 2.5 feet, such as at least 3 feet. In some implementations, the second distance d2 is about 0.5 feet, or about 1 foot, or about 1.5 feet, or about 2 feet. In one example, the second distance d2 is a distance that allows access to the right side of the truck 126. In another example, the second distance d2 is a distance that does not allow allows access to the right side of the truck 126. In such an example, the vehicle 102 may be positioned a distance from the car 128 that allows access to the right side of the car 128, which favors providing access to a driver to the car 128 over access to a non-driving passenger to the truck 126.

The vehicle 102 follows a trajectory when repositioning. In some embodiments, the control circuitry 190 sounds an audible sound or alarm (e.g., through speakers of the vehicle 102 or the horn) and/or flashes lights of the vehicle 102 (e.g., lights 1626, discussed below in relation to FIG. 16) to alert surrounding people that the vehicle 102 is about to self-drive or is self-driving. The control circuitry 190 may use any conventional means known to one skilled in the art to avoid colliding with a person, vehicle, or other object while driving the vehicle 102. In some embodiments, the distance d2 centers the vehicle 102 between the left and right lines of the parking spot 120. The process 140 continues to operation 160 and ends.

In some embodiments, the vehicle 102 does not follow the trajectory shown in FIG. 1C. In some implementations, the vehicle 102 does not fully exit the parking spot 120 when repositioning. In some implementations, the vehicle 102 remains in the parking spot 120 such that no portion of the vehicle 102 exits the parking spot 120 when repositioning. In some implementations, the vehicle 102 repositions by having all of its wheels alternate from being turned left or right when the vehicle 102 moves and performs a "crab walk" such that the vehicle 102 moves laterally between the car 128 and truck 126. In one example, the steering system 106 uses a steer-by-wire system, which allows steering of some or all of the wheels of the vehicle 102 without a steering column connected to the wheel axles.

In some embodiments, the control circuitry 190 uses the distance needed for each passenger to exit the vehicle 102 to determine whether the operations 154-158 are necessary. For example, the control circuitry 190 determines the first distance d1 from the truck 126 that allows each passenger of the vehicle 102 to exit without repositioning the vehicle 102 at the distance d2. In some implementations, the control circuitry 190 ensures passengers of the adjacent truck 126 and car 128 can access their respective vehicle.

In some embodiments, the system 100 positions the vehicle 102 in a designated parking location or spot to drop off passengers. Once the passengers have exited and moved away from the vehicle 102, the system 100 positions the vehicle 102 in the parking spot 120 (e.g., at the distance d2 from the truck 126).

Figure 2:
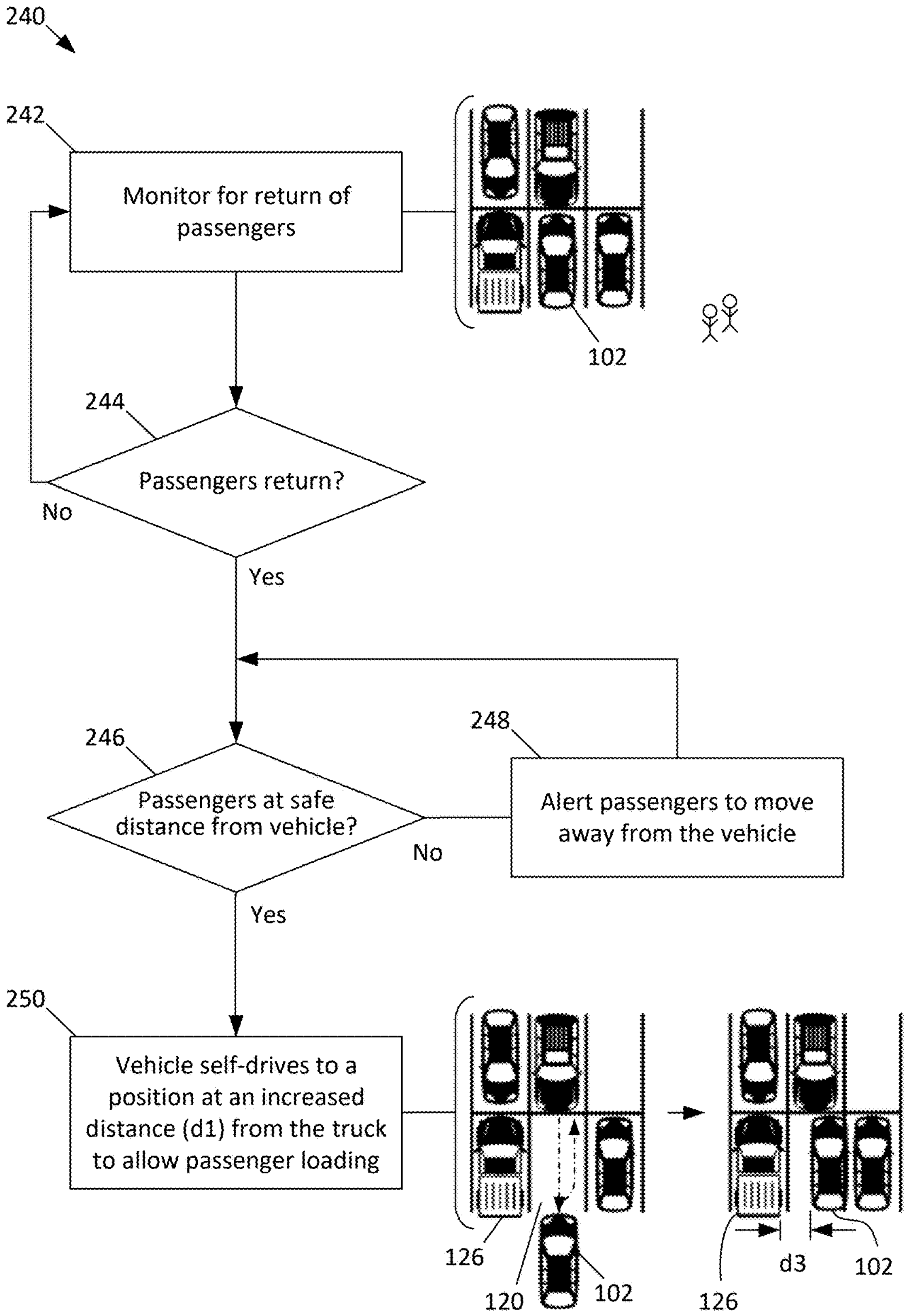
FIG. 2 is a schematic illustration of a process for using a system to position a vehicle during parking to allow passengers to safely enter the vehicle, in accordance with embodiments of the disclosure.

FIG. 2 is a schematic illustration of a process 240 for using a system (e.g., system 100 in FIG. 1A and easy access system 506, described below in FIGS. 5-6 and 11-14) to position the vehicle 102 during parking to allow passengers to safely enter the vehicle 102, in accordance with embodiments of the disclosure. The process 240 shown in FIG. 2 may be implemented, in whole or in part, by one or more systems or devices described herein.

The process 240 starts at operation 242 with control circuitry (e.g., control circuitry 190 discussed in FIG. 1A or control circuitry 1612, discussed below in relation to FIG. 16) monitoring for the passengers to return to the vehicle 102.

The process 240 continues to operation 244 with the control circuitry determining if the passengers have returned to the vehicle 102. In some embodiments, the control circuitry uses sensors (e.g., sensors 108 in FIG. 1A and vehicle sensors 508 and sensors 1608, discussed below in relation to FIGS. 5 and 16) to determine if the passengers have returned. In some implementations, the sensors are used to determine if a person is present, such as discussed in relation to operation 156 in FIG. 1C. In some implementations, the control circuitry uses the data from the sensors with facial recognition techniques to identify a passenger has returned. In some implementations, the control circuitry determines a passenger has returned by detecting a device (e.g., wireless user communications device 1722, discussed below in relation to FIGS. 16 and 17) of the passenger that is registered with the vehicle 102 is in close proximity to the vehicle 102. In one implementation, a signal strength between the device and the vehicle (e.g., through communications network 1710, discussed below in relation to FIG. 17) is used to determine the passenger has returned. In one example, the control circuitry determines the signal strength is increasing and determines the passenger is in close proximity to the vehicle. In another implementation, the control circuitry uses a received location of the passenger, such as from an app on a device of the passenger or from a digital key corresponding to the vehicle 102, to determine the passenger has returned. In some embodiments, the control circuitry sends a request to the device of the passenger to solicit confirmation that the passenger has returned.

If the determination at operation 244 is no, the process continues to operation 242. If the determination at operation 244 is yes, the process 240 continues to operation 246 with the control circuitry determining if the passengers are at a safe distance from the vehicle 102.

If the determination at operation 246 is no, the process 240 continues to operation 248 with the control circuitry alerting passengers to move away from the vehicle 102 (e.g., by executing the vehicle element control application). In some embodiments, the alert comprises a message or notification sent to a device of the passengers. In some embodiments, the alert comprises an audible alert played through a speaker of the vehicle 102 (e.g., speakers 1624, discussed below in relation to FIG. 16) or activation of the horn. The process 240 continues to operation 246, such as after a predetermined amount of time after the alert.

If the determination at operation 246 is yes, the process 240 continues to operation 248 with the control circuitry driving the vehicle 102 to position the vehicle 102 at a third distance d3 from the truck 126, such as discussed in relation to operation 152 in FIG. 1B. The distance d2 (FIG. 1C) is less than the third distance d3. The third distance d3 may be the same as, greater than, or less than the first distance d1 (FIG. 1B). The vehicle 102 follows a trajectory, shown as a dashed-dotted line, when repositioning. Thus, operation 250 may be the reverse of operation 158 discussed in relation to FIG. 1C. In some implementations, the control circuitry drives the vehicle 102 by executing the vehicle element control application. In some embodiments, the control circuitry positions the vehicle 102 at a greater or lesser distance from the truck 126 than the third distance d3. In some embodiments, the control circuitry 190 directs vehicle control circuitry or autopilot control circuitry to drive the vehicle 102, such as through the I/O circuitry.

In some embodiments, the process 240 is executed when the vehicle 102 is in a "departure" state. In such embodiments, the process 140 described in relation to FIGS. 1A-1C is executed when the vehicle 102 is in an "arrival" state. In some embodiments, the process 240 performed in the departure state is the reverse of the process 140 performed in the arrival state. In some embodiments, the control circuitry associates the arrival and departure states with a navigation request comprising a destination. In some implementations, vehicle 102 is in the arrival state when en route to the destination and in the departure state when leaving the destination.

Figure 3A:
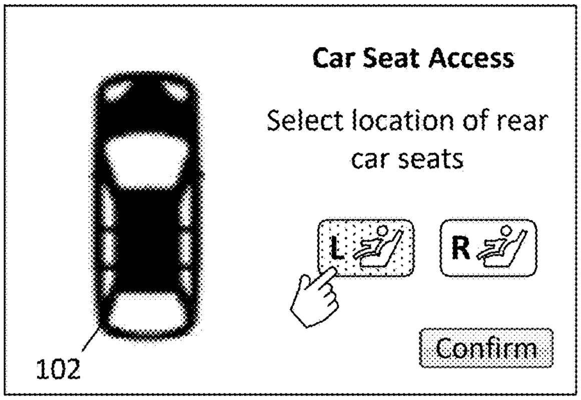
FIGS. 3A-3C are representations of different graphical user interfaces of a system for positioning a vehicle during parking, in accordance with embodiments of the disclosure.
Figure 3B:
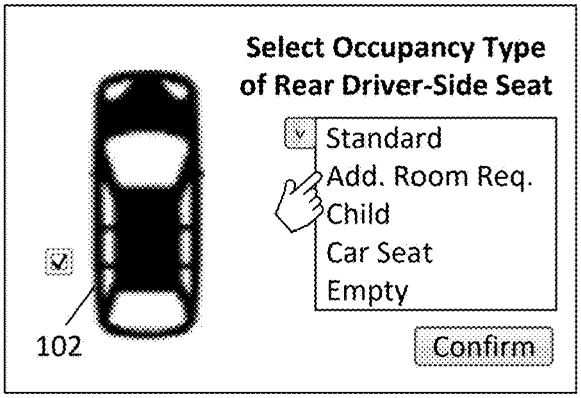
Figure 3C:
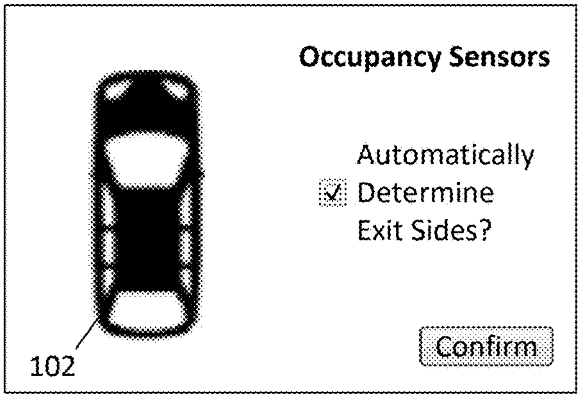

FIGS. 3A-3C are representations of different GUIs of a system (e.g., system 100 in FIG. 1A and easy access system 506, described below in FIGS. 5-6 and 11-14) for positioning the vehicle 102 during parking, in accordance with embodiments of the disclosure. In some implementations, the GUIs are presented on a user interface (e.g., user interface 110 in FIG. 1A, and user interface 504 and user input interface 1602, discussed below in relation to FIG. 5 and FIGS. 12-14 and 16), such as a display screen located within the vehicle 102.

Referring to FIG. 3A, an illustrative vehicle 102 is shown on the left side of the GUI and car seat access options on the right side. In some implementations, the user uses the car seat access options to select whether a left and/or right rear seat of the vehicle 102 contains a car seat. In the embodiment depicted in FIG. 3A, a pointer is shown as selecting the left side. The user may select a "confirm" button to confirm the selections and proceed to another GUI. In some embodiments, control circuitry (e.g., control circuitry 190 discussed in FIG. 1A or control circuitry 1612, discussed below in relation to FIG. 16) presents the GUI if a car seat access option is selected or enabled, such as discussed in relation to operation 144 of FIG. 1A. In some embodiments, the system activates a "kid mode" when a car seat is selected on the GUI. In some implementations, the control circuitry uses the kid mode indication when executing operations to position the vehicle 102 during parking.

Referring to FIG. 3B, the illustrative vehicle 102 is shown on the left side of the GUI with a box indicating what seat is selected. Vehicle occupancy options are shown on the right side. The vehicle occupancy options are used to provide information on passengers that occupy the seats of the vehicle 102. In the depicted embodiment, the rear driver-side seat is selected and the vehicle occupancy options for this seat include "standard," "additional room required," "child," "car seat," and "empty." In the embodiment depicted in FIG. 3B, a pointer is shown as selecting the "additional room required" option. The GUI may be used to provide additional information to the control circuitry. For example, referring to FIG. 1B, information provided through the GUI is used to determine the trajectory in operation 150. IN one example, selecting "standard" positions the vehicle 102 at the first distance d1 from the truck 126. In another example, selecting "additional room required" or "car seat" positions the vehicle 102 at a distance from the truck 126 that is greater than the first distance d1. In another example, selecting "child" positions the vehicle 102 at a distance from the truck 126 that is less than the first distance d1. In another example, selecting "empty" informs the control circuitry know not to consider the rear driver-side seat when determining the distance from the truck 126.

In some implementations, the "additional room required" option is selected for passengers requiring additional room to access the vehicle. Such passengers may include larger passengers, passengers having a disability (e.g., Parkinson's disease, cerebral palsy, multiple sclerosis, or amyotrophic lateral sclerosis), or passengers loading or unloading items (e.g., packages, bags, crutches, or wheelchairs). In some embodiments, selecting the "additional room required" option displays another GUI or additional GUI elements to allow selection of the appropriate passenger option (e.g., larger passenger or disability).

In some embodiments, selecting the "car seat" option activates a "kid mode" as discussed in relation to FIG. 3A.

In some embodiments, the vehicle occupancy options are customizable. For example, the distance between the vehicle 102 and the truck 126 is set for each vehicle occupancy option.

Referring to FIG. 3C, the illustrative vehicle 102 is shown on the left side of the GUI and vehicle occupancy sensor options on the right side. The user may use the occupancy sensor options to select whether to use occupancy sensors to automatically determine which seats contain passengers. In some implementations, if a seat contains a passenger, the control circuitry determines the passenger will exit the side of the vehicle nearest to the seat. Thus, the occupancy sensors may be used to automatically determine the exit sides of the vehicle. The user may select a "confirm" button to confirm the selection and proceed to another GUI.

In some embodiments, the control circuitry uses the selections from the GUIs discussed in relation to FIGS. 3A-3C to automatically determine whether a child is present in a car seat. For example, if enabled, the control circuitry uses the occupancy sensors to determine whether a child is present in a car seat. If the occupancy sensors comprises a weight sensor, the control circuitry compare the unloaded weight of the car seat to a current weight to determine if a child is present. In one example, the control circuitry verifies its determination using the car seat access option selections and/or input from the user.

In some embodiments, the control circuitry alerts the passengers, such as through the user interface, that a child is detected but not selected in the car seat access option selections. In such embodiments, the control circuitry requires confirmation that a child is occupying the car seat before proceeding.

In some embodiments, the control circuitry uses the occupancy sensors and car seat selection options to determine if a child is left in a car seat after the remaining passengers exit the vehicle. In such embodiments, the control circuitry sends a message or notification to a device of a passenger (e.g., wireless user communications device 1722, discussed below in relation to FIGS. 16 and 17). In some embodiments, the control circuitry provides an audible alert through a speaker of the vehicle 102 (e.g., speakers 1624, discussed below in relation to FIG. 16) or activates the horn to alert the passengers or nearby people.

Figure 4A:
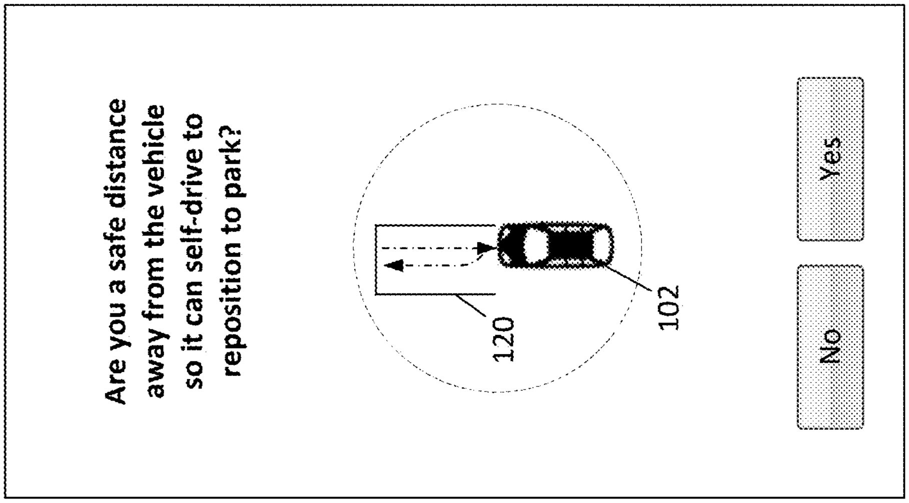
FIGS. 4A-4C are representations of different graphical user interfaces of a device connected to a system for positioning a vehicle during parking, in accordance with embodiments of the disclosure.
Figure 4B:
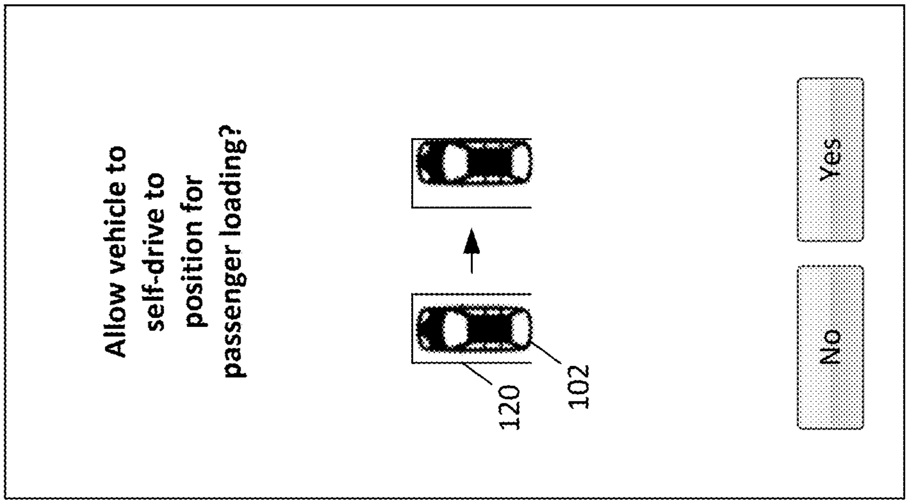
Figure 4C:
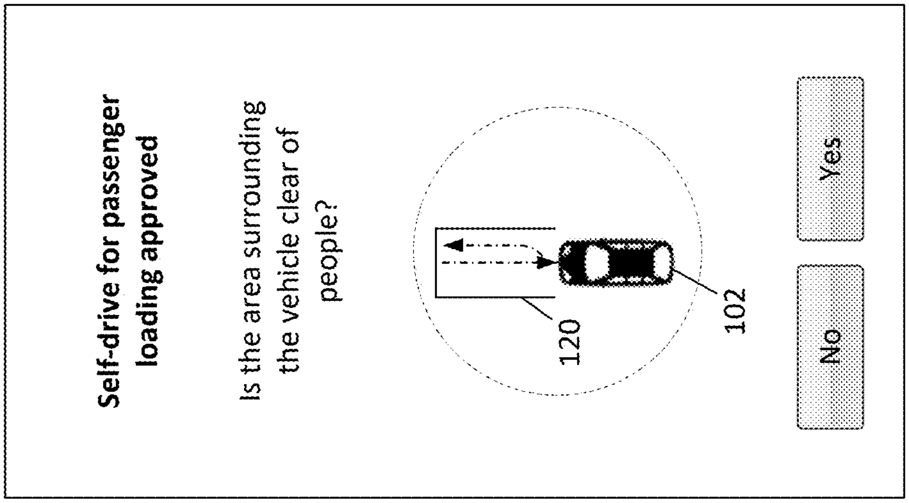

FIGS. 4A-4C are representations of different GUIs of a device (e.g., wireless user communications device 1722, discussed below in relation to FIGS. 16 and 17) connected to a system (e.g., system 100 in FIG. 1A and easy access system 506, described below in FIGS. 5-6 and 11-14) for positioning the vehicle 102 during parking, in accordance with embodiments of the disclosure. In particular, the GUI of FIG. 4A may be used to reposition the vehicle 102 after passengers have exited. The GUIs of FIGS. 4B and 4C may be used to reposition the vehicle 102 for passenger loading. In some implementations, the GUIs are presented on a display screen of the device.

Referring to FIG. 4A, the GUI asks a user of the device if they are a safe distance away from the vehicle 102 so control circuitry (e.g., control circuitry 190 discussed in FIG. 1A or control circuitry 1612, discussed below in relation to FIG. 16) can reposition the vehicle 102 to park in the parking spot 120. An illustrative vehicle 102 is shown in the GUI following a trajectory into a parking spot to inform the user of the planned maneuvers. The user may select a "no" or a "yes" button to inform the control circuitry whether it is safe to reposition the vehicle 102.

In some embodiments, the GUI is used during operation 156 discussed in relation to FIG. 1C to determine if the passengers are at a safe distance from the vehicle 102.

Referring to FIG. 4B, the GUI asks the user of the device whether to position the vehicle 102 for passenger loading. The GUI shows the illustrative vehicle 102 moved from a parked position in the parking spot 120 to a loading position in the parking spot 120. The user may select a "no" or a "yes" button to inform the control circuitry whether to reposition the vehicle 102.

In some embodiments, the GUI is used during any of the operations discussed in relation to FIG. 2 to request the control circuitry reposition the vehicle 102 for passenger loading.

Referring to FIG. 4C, the GUI asks the user of the device if the area surrounding the vehicle 102 is clear of people so the control circuitry may reposition the vehicle 102 for passenger loading. An illustrative vehicle 102 is shown repositioning in the GUI. The user may select a "no" or a "yes" button to inform the control circuitry whether to reposition the vehicle 102.

In some embodiments, the GUI is used during operation 246 discussed in relation to FIG. 2 to determine if the passengers are at a safe distance from the vehicle 102.

Figure 5:
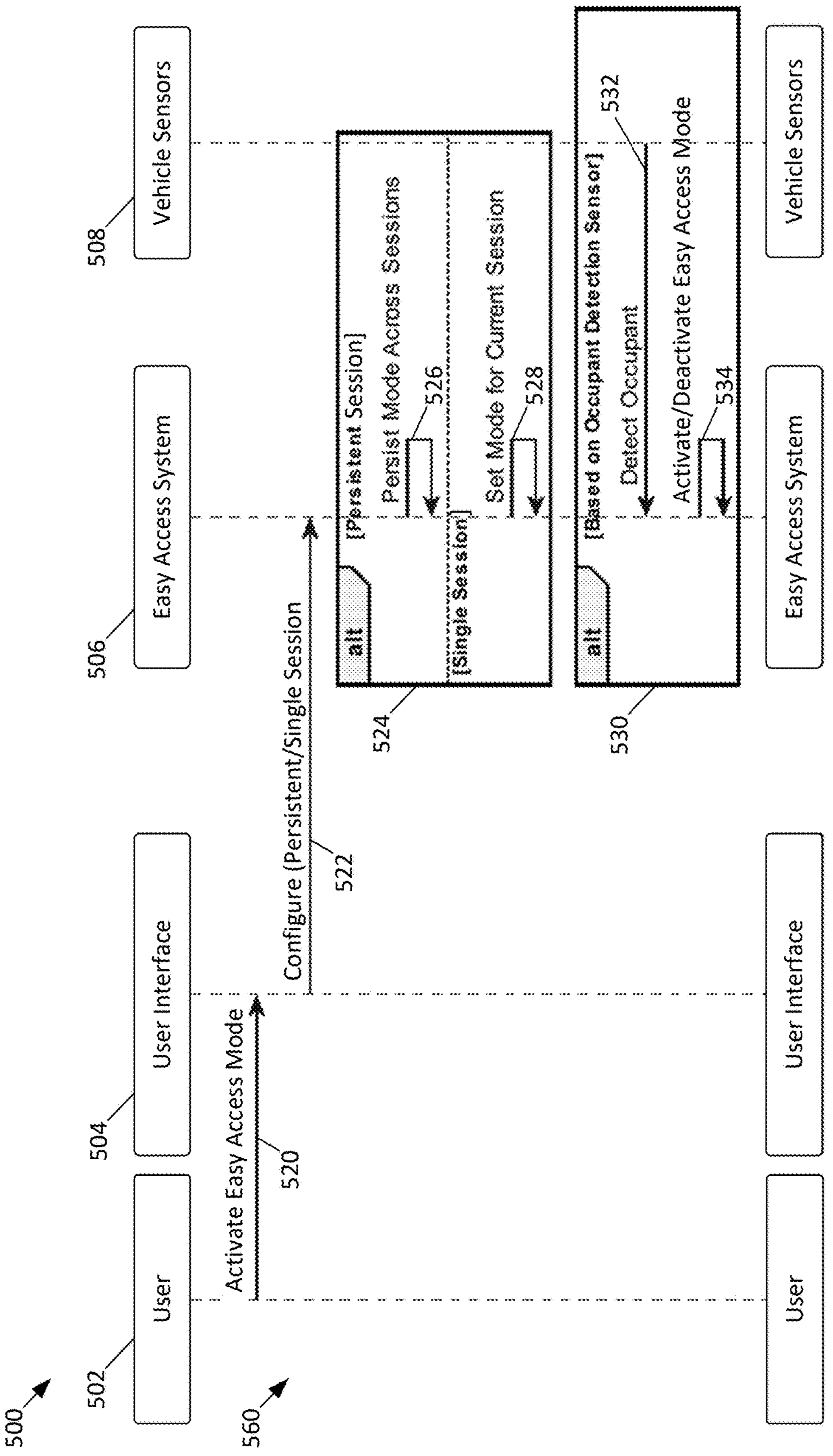
FIG. 5 illustrates an example sequence diagram defining activation of a system for positioning a vehicle during parking, in accordance with embodiments of the disclosure.

FIG. 5 illustrates an example sequence diagram 500 defining activation of an easy access system 506 (e.g., system 100 in FIGS. 1A-1C) for positioning a vehicle (e.g., vehicle 102 in FIGS. 1A-4 and below in FIGS. 8A-9C) during parking, in accordance with embodiments of the disclosure.

A process 560 depicted by the sequence diagram 500 includes a series of operations. The process 560 may be implemented, in whole or in part, by one or more systems or devices described herein. Reading from the top to the bottom of FIG. 5, in some embodiments, each operation is performed in response to the previous operation. Operations are repeated, duplicated, and/or omitted in some embodiments. Additional operations disclosed herein are included in some embodiments. Entities are shown at the top and bottom of the figure and connected by a dashed vertical line. Messages between the entities are depicted as horizontal arrows with the name of the message superimposed above the arrows. The arrows are shown with end points connecting to the entities. Boxes that are labeled "alt" are drawn around the messages of operations that may be conditional. In one example, execution of the operations in the alt boxes are based on whether a condition is satisfied.

The entities include a user 502 (e.g., a vehicle occupant, a passenger, the driver, or an agent of such), user interface 504 (e.g., user interface 110 in FIG. 1A and display system 1604, discussed below in relation to FIG. 16), the easy access system 506, and vehicle sensors 508 (e.g., sensors 108 in FIG. 1A and sensors 1608, discussed below in relation to FIG. 16). The process 560 includes the user 502 inputting 520 a request to active an easy access mode the user interface 504, which receives the request. In some embodiments, the user interface 504 includes a user device, such as wireless user communications device 1722 discussed below in relation to FIG. 17. The user interface 504 transmits 522 configuration information to the easy access system 506. The configuration information includes whether to activate the easy access mode as a single session or persistent session (e.g., activated across multiple driving sessions). In one example, the configuration information includes an indication that the kid mode discussed in relation to FIGS. 3A and 3B is active and the easy access system 506 activates the easy access mode in a persistent session. The configuration information may be received from the inputted 520 request or may be a previously provided (e.g., accessed from a non-transitory memory such as storage 1614, discussed below in relation to FIG. 16). The easy access system 506 includes I/O circuitry (e.g., I/O circuitry 192 in FIG. 1A and I/O path 1616, discussed below in relation to FIG. 16) to receive inputs and control circuitry (e.g., control circuitry 190 in FIG. 1A and control circuitry 1612, discussed below in relation to FIG. 16) to process and execute the received inputs (e.g., by executing the vehicle element control application). In some implementations, the control circuitry executes the vehicle interface application and/or the vehicle communications application to receive the inputs from the I/O circuitry. The process 560 continues to one of two operational paths based on how the system is configured.

The operations 526-528 in alt box 524 are based on user inputs. If the persistent session is active, the easy access system 506 automatically executes 526 the easy access mode with saved preferences. If the single session is active, the easy access system 506 executes 528 the easy access mode with received preferences to determine which side of the vehicle the passengers will exit. In some embodiments, the operations in alt box 524 are based on the result of operation 144 discussed in relation to FIG. 1A. For example, the operations in alt box 524 occur when the "easy access mode" selection box of the GUI is selected. In some embodiments, the operations in alt box 530 are based on the result of selections made in the GUI discussed in relation to FIG. 3C. For example, the operations in alt box 524 occur when the "automatically determine exit sides" selection box of the GUI is not selected.

The operations 532-534 in alt box 530 are based on input received from the vehicle sensors 508 and, in some implementations, are used to automatically activate the easy access mode. The vehicle sensors 508 send 532 data to the easy access system 506, which uses the sensor data to detect whether a passenger is occupying a seat of the vehicle. The easy access system 506 activates or deactivates 534 the easy access mode using the received sensor data. For example, the easy access mode is activated or deactivated based on whether a passenger is occupying a seat of the vehicle. In some embodiments, the operations in alt box 530 are based on the result of operation 144 discussed in relation to FIG. 1A. In some embodiments, the operations in alt box 530 are based on the result of selections made in the GUI discussed in relation to FIG. 3C. For example, the operations in alt box 524 occur when the "automatically determine exit sides" selection box of the GUI is selected.

Figure 6:
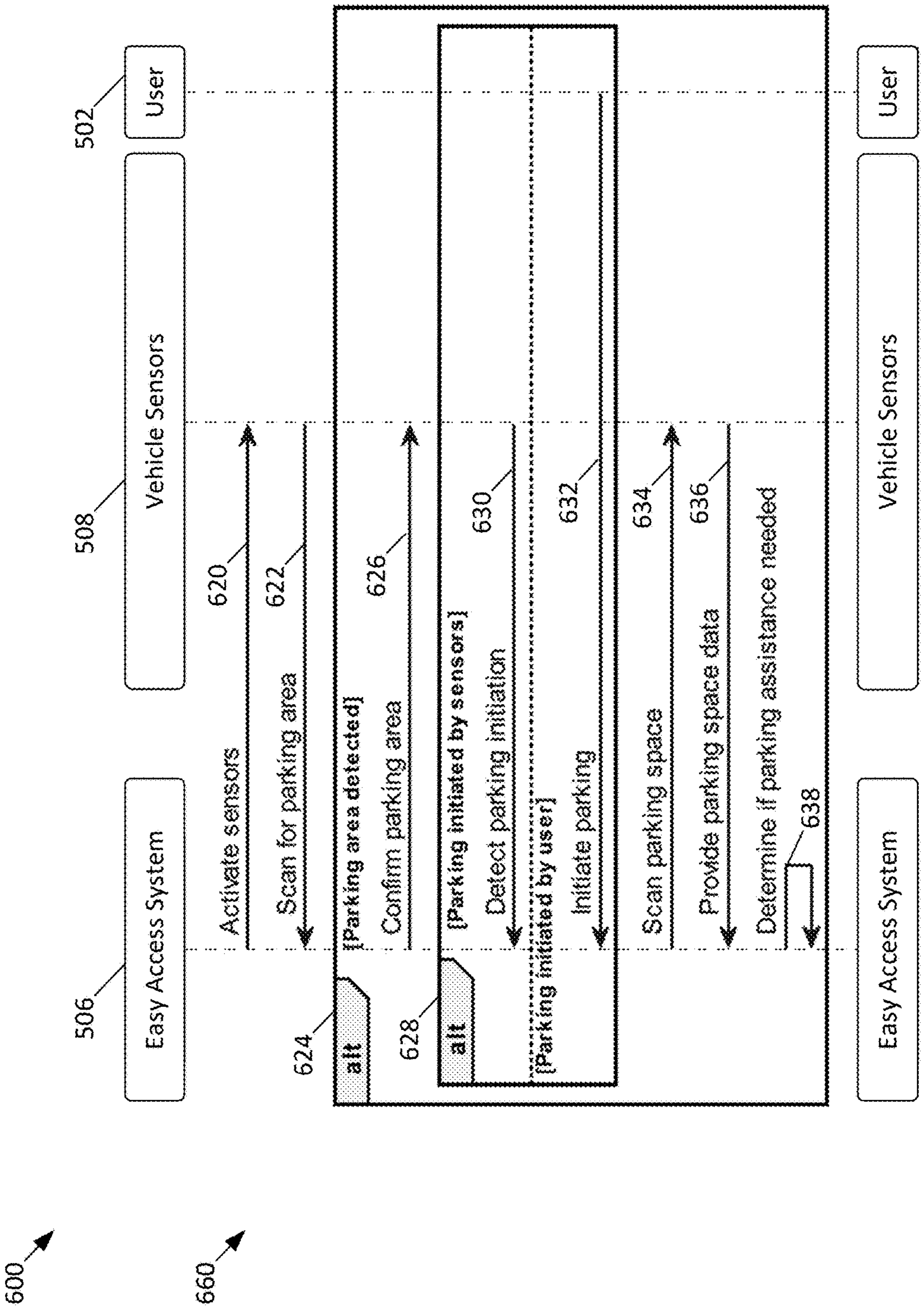
FIG. 6 illustrates an example sequence diagram defining use of sensors to position a vehicle during parking to allow passengers to safely access the vehicle, in accordance with embodiments of the disclosure.

FIG. 6 illustrates an example sequence diagram 600 defining use of the vehicle sensors 508 to position a vehicle (e.g., vehicle 102 in FIGS. 1A-4 and below in FIGS. 8A-9C) during parking to allow passengers to safely access the vehicle, in accordance with embodiments of the disclosure.

The sequence diagram 600 depicts messages between entities during a process 660. The process 660 may be implemented, in whole or in part, by one or more systems or devices described herein. The entities include the user 502, the easy access system 506, and the vehicle sensors 508. The process 660 includes the easy access system 506 transmitting 620 a request to activate sensors to the vehicle sensors 508. The vehicle sensors 508 scan for a parking area and send 622 corresponding sensor data to the easy access system 506.

The process 660 continues to conditional operations 626-638 in alt box 624 when a parking area is detected. For example, detection of the parking spot is based on the result of operation 144 discussed in relation to FIG. 1A. The easy access system 506 transmits 626 a request to confirm parking area to the vehicle sensors 508. The operations 630-632 in alt box 628 are based on user input. For example, determination of the operation that is executed is based on whether the "automatically determine exit sides" selection box of the GUI discussed in relation to FIG. 3C is selected. If the selection box is selected and parking is initiated by the vehicle sensors 508, the vehicle sensors 508 send 630 sensor data to the easy access system 506 to detect parking initiation. If the selection boxed in not selected and parking is initiated by the user 502, such as discussed in relation to operation 150 in FIG. 1B, the user 502 sends 632 a request to the easy access system 506 to initiate parking. Returning to alt box 624, the easy access system 506 sends 634 a request to the vehicle sensors 508 to scan the parking space. The vehicle sensors 508 scan the parking space and send 636 corresponding sensor data to the easy access system 506. The easy access system 506 determines 638 if parking assistance is needed.

Figure 7:
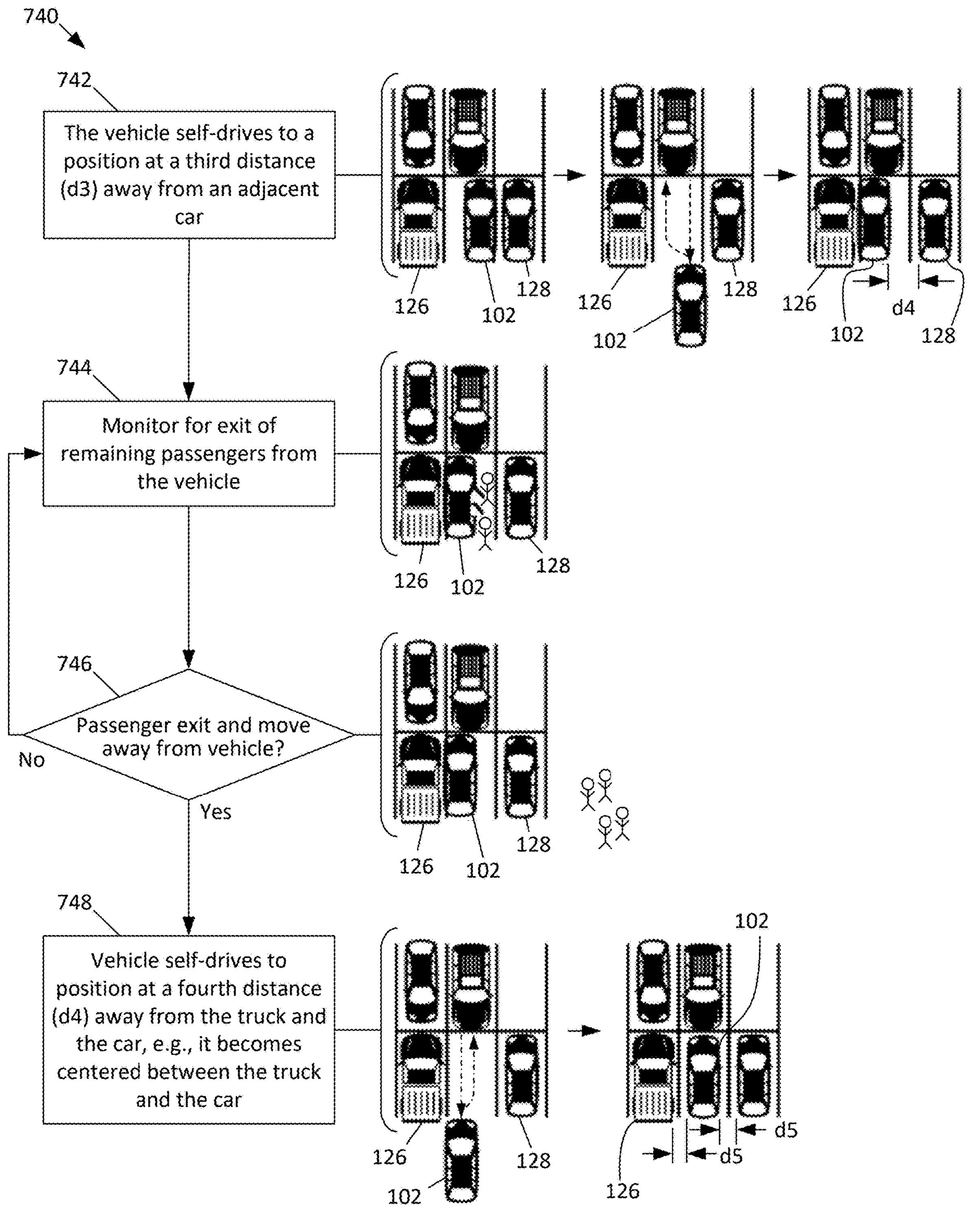
FIG. 7 is a schematic illustration of a process for using a system to reposition a vehicle during parking to allow passengers to safely exit the vehicle, in accordance with embodiments of the disclosure.

FIG. 7 is a schematic illustration of a process 740 for using a system (e.g., system 100 in FIG. 1A and easy access system 506 in FIGS. 5-6 and 11-14) to reposition the vehicle 102 during parking to allow passengers to safely exit the vehicle 102, in accordance with embodiments of the disclosure. In particular, the process 740 is used when passengers exit the right side of the vehicle 102 after passengers have previously exited the left side of the vehicle 102. The process 740 shown in FIG. 7 may be implemented, in whole or in part, by one or more systems or devices described herein.

The process 740 starts at operation 742 with control circuitry (e.g., control circuitry 190 discussed in FIG. 1A or control circuitry 1612, discussed below in relation to FIG. 16) directing the vehicle 102 to self-drive to a position in the parking spot 120 at a fourth distance (d4) away from the adjacent car 128. In some embodiments, the control circuitry communicates (e.g., over communications network 1214, 1710, discussed below in relation to FIGS. 12 and 17) with control circuitry of another system (e.g., control circuitry of a motor and steering control system(s) 1316, discussed below in relation to FIG. 13) through I/O circuitry (e.g., I/O circuitry 192 in FIG. 1A and I/O path 1616, discussed below in relation to FIG. 16) to direct the vehicle 102. In some embodiments, the control circuitry controls the maneuvers when positioning the vehicle 102 (e.g., by controlling drive and steering systems on the vehicle). In some embodiments, operation 742 follows operation 156 discussed in relation to in FIG. 1C.

The process 740 continues to operation 744 with the control circuitry monitoring for exit of remaining passengers from the vehicle 102 (e.g., from the right side of the vehicle). In some embodiments, the remaining passengers confirm, via a user interface (e.g., the GUI in FIG. 4A) they are a safe distance from the vehicle 102. In some embodiments, one of the passengers confirms that all passengers are a safe distance away.

The process 740 continues to operation 746 with the control circuitry determining if the remaining passengers have exited and moved away from the vehicle 102. If the determination is no, then the process 740 continues to operation 744. If the determination is yes, then the process 740 continues to operation 748 with the control circuitry directing the vehicle 102 to self-drive to position at a fifth distance (d5) away from the adjacent truck 126 and the adjacent car 128. For example, the vehicle 102 becomes centered between the adjacent truck 126 and the adjacent car 128 such the actual distances to each of the adjacent truck 126 and the adjacent car 128 are within 0.5 feet of one another, such as within 1 foot of one another, such as within 2 feet of one another.

Figure 8A:
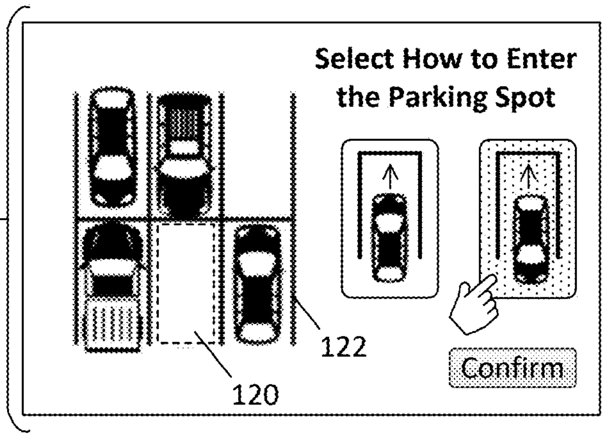
FIGS. 8A-8C are schematic illustrations of different processes for using a system to position a vehicle back-end first into a parking spot during parking to allow passengers to safely exit the vehicle, in accordance with embodiments of the disclosure.
Figure 8A:
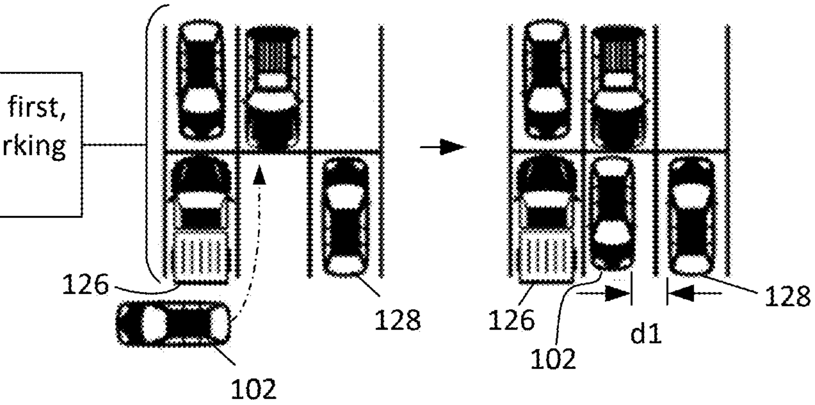
Figure 8A:
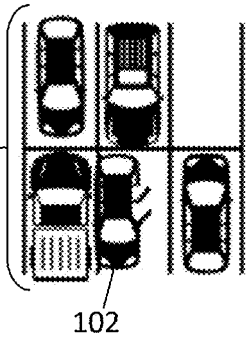
Figure 8B:
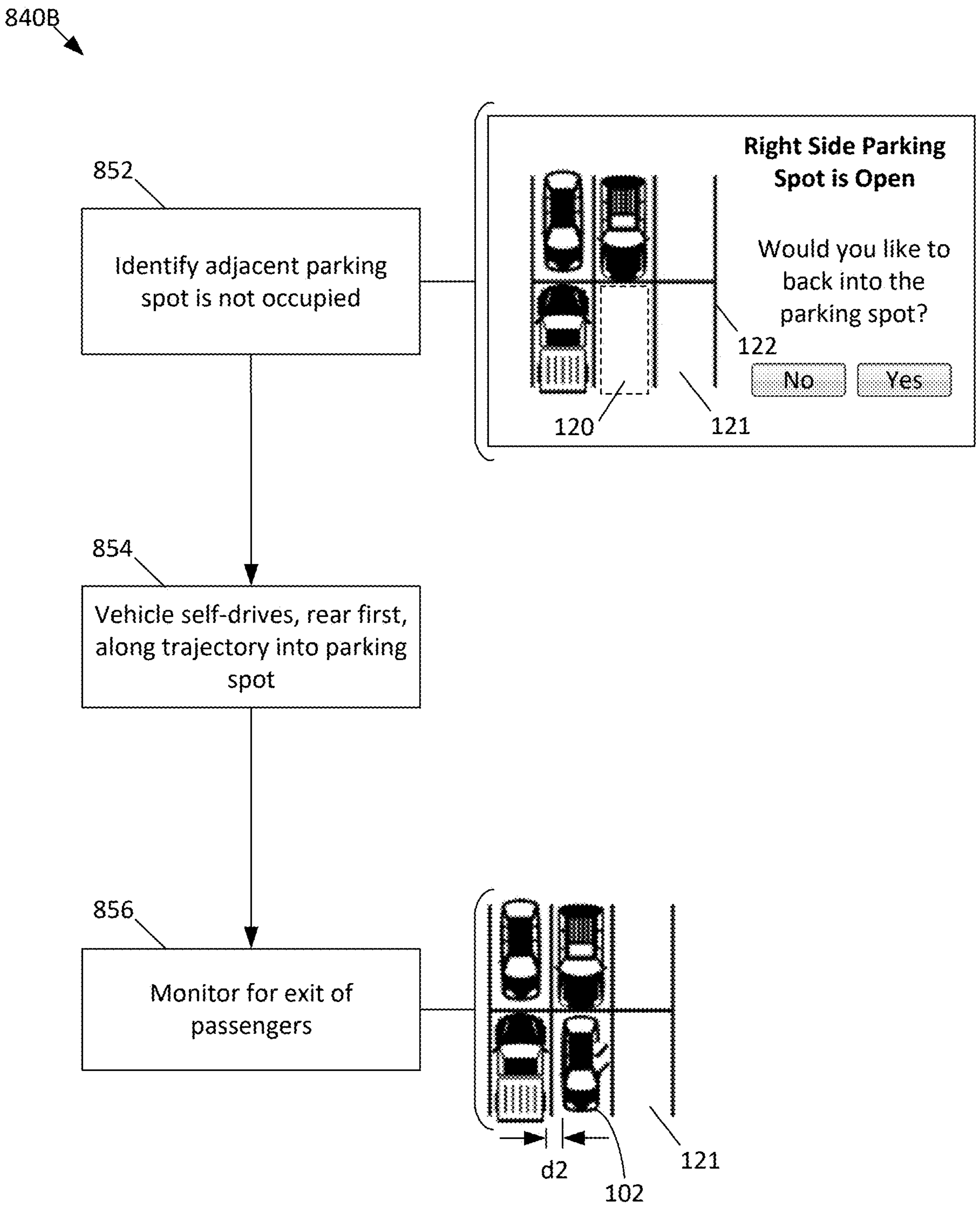
Figure 8C:
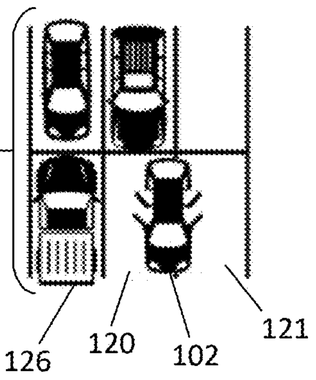

FIGS. 8A-8C are schematic illustrations of different processes 840A-C for using a system (e.g., system 100 in FIG. 1A and easy access system 506 in FIGS. 5-6 and 11-14) to position the vehicle 102 back-end first into the parking spot 120 during parking to allow passengers to safely exit the vehicle 102, in accordance with embodiments of the disclosure. The processes 840A-C shown in FIGS. 8A-8C may be implemented, in whole or in part, by one or more systems or devices described herein.

FIG. 8A shows the process 840A for maneuvering the vehicle 102 based on a user input. The process 840A starts at operation 842 with control circuitry (e.g., control circuitry 190 discussed in FIG. 1A or control circuitry 1612, discussed below in relation to FIG. 16) identifying whether to back in the vehicle 102 into the parking spot 120. The control circuitry receives a user input (e.g., by executing the vehicle interface application) indicating whether to back in. In the embodiment depicted in FIG. 8A, the user input is through a GUI on a display screen of a user interface (e.g., user interface 110 in FIG. 1A, user interface 504 in FIGS. 5 and 12-14, and user input interface 1602, discussed below in relation to FIG. 16). The GUI displays the parking lot 122 on its left, which contains the parking spot 120, and options for parking on its right. In one example, a user selects from parking options that include entering the parking spot 120 front first or rear first (e.g., rear first is shown as selected) and then selects a "confirm" button. In the embodiment depicted in FIG. 8A, a pointer is shown as selecting to back in.

In some embodiments, the control circuitry identifies the parking spot 120 by executing the vehicle element control application. In some embodiments, the control circuitry identifies the parking spot 120 by executing the vehicle interface application to receive an input from the I/O circuitry.

The process 840A continues to operation 844 with the control circuitry determining a trajectory (shown as a dashed-dotted line) to position the vehicle 102 (e.g., by executing the vehicle element control application) rear first in the parking spot 120 such that passengers can exit the left side of the vehicle 102 (e.g., the driver's side) towards the adjacent car 128.

The process 840A continues to operation 846 with the control circuitry directing the vehicle 102 (e.g., by executing the vehicle element control application) to self-drive, rear first, along the trajectory into parking spot 120.

The process 840A continues to operation 848 with the control circuitry monitoring for exit of passengers. In some embodiments, the control circuitry determines the passengers have exited and moved away from the vehicle 102. The control circuitry, in response, self-drives the vehicle 102 to a position centered in the parking spot 120 or centered between the adjacent truck 126 and car 128, to name a few examples, such as described in relation to operations 156-158 in FIG. 1C. In some embodiments, the control circuitry centers the vehicle 102 rear first.

Figure 16:
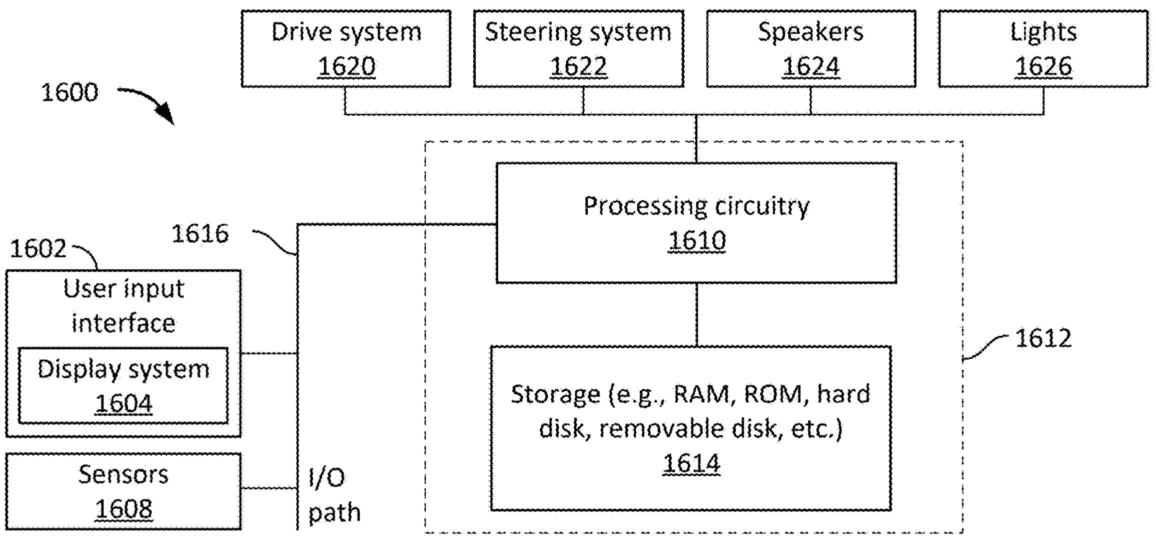
FIG. 16 depicts example devices and related hardware for receiving input from a user interface and positioning a vehicle during parking to allow passengers to safely access the vehicle based on the input, in accordance with some embodiments of this disclosure.

In some embodiments, the control circuitry solicits input (e.g., through a user interface, such as user interface 110 in FIG. 1A, user interface 504 in FIGS. 5 and 12-14, and user input interface 1602 in FIG. 16) from a user on whether to enter the parking spot 120 rear first to allow additional room to remove or place a child in a car seat. In such embodiments, the control circuitry uses user input previously received (e.g., the GUI in FIG. 3A or 3B) to determine a car seat is being used.

FIG. 8B shows the process 840B for maneuvering the vehicle 102 based on an empty adjacent parking spot 121. The process 840B starts at operation 852 with the control circuitry identifying an adjacent parking spot 121 (e.g., adjacent to parking spot 120) is not occupied by a vehicle. In some embodiments, the control circuitry identifies the parking spot 120 by executing the vehicle element control application. In some embodiments, the control circuitry identifies the parking spot 120 by executing the vehicle interface application to receive an input from the I/O circuitry.

The process 840B continues to operation 854 with the control circuitry directing the vehicle to self-drive, rear first, along a trajectory into parking spot 120. In some embodiments, the control circuitry solicits input (e.g., through a user interface, such as user interface 110 in FIG. 1A, user interface 504 in FIGS. 5 and 12-14, and user input interface 1602 in FIG. 16) from a user on whether to park the vehicle 102 in the adjacent parking spot 121.

The process 840B continues to operation 856 with the control circuitry monitoring for exit of passengers.

FIG. 8C shows the process 840C for maneuvering the vehicle 102 based on an empty adjacent parking spot 121. The process 840C starts at operation 862 with the control circuitry identifying the adjacent parking spot 121 is not occupied by a vehicle.

The process 840C continues to operation 864 with the control circuitry directing the vehicle 102 to self-drive into the parking spot 120 such that rear of vehicle 102 is in front of parking spot. The control circuitry positions the vehicle 102 partly in the adjacent parking spot 121 to allow the passengers to exit the right side of the vehicle 102. In some embodiments, the vehicle 102 is positioned far enough into the adjacent parking spot 121 to provide enough space between the vehicle 102 and the adjacent truck 126 so passengers may exit both sides of the vehicle 102 at the same time (e.g., without repositioning the vehicle 102).

The process 840C continues to operation 866 with the control circuitry monitoring for exit of the passengers.

The process 840C continues to operation 868 with the control circuitry directing the vehicle 102 to self-drive to a position such that front of vehicle 102 is in front of the parking spot 120 and the vehicle 102 becomes centered in the parking spot 120.

Figure 9A:
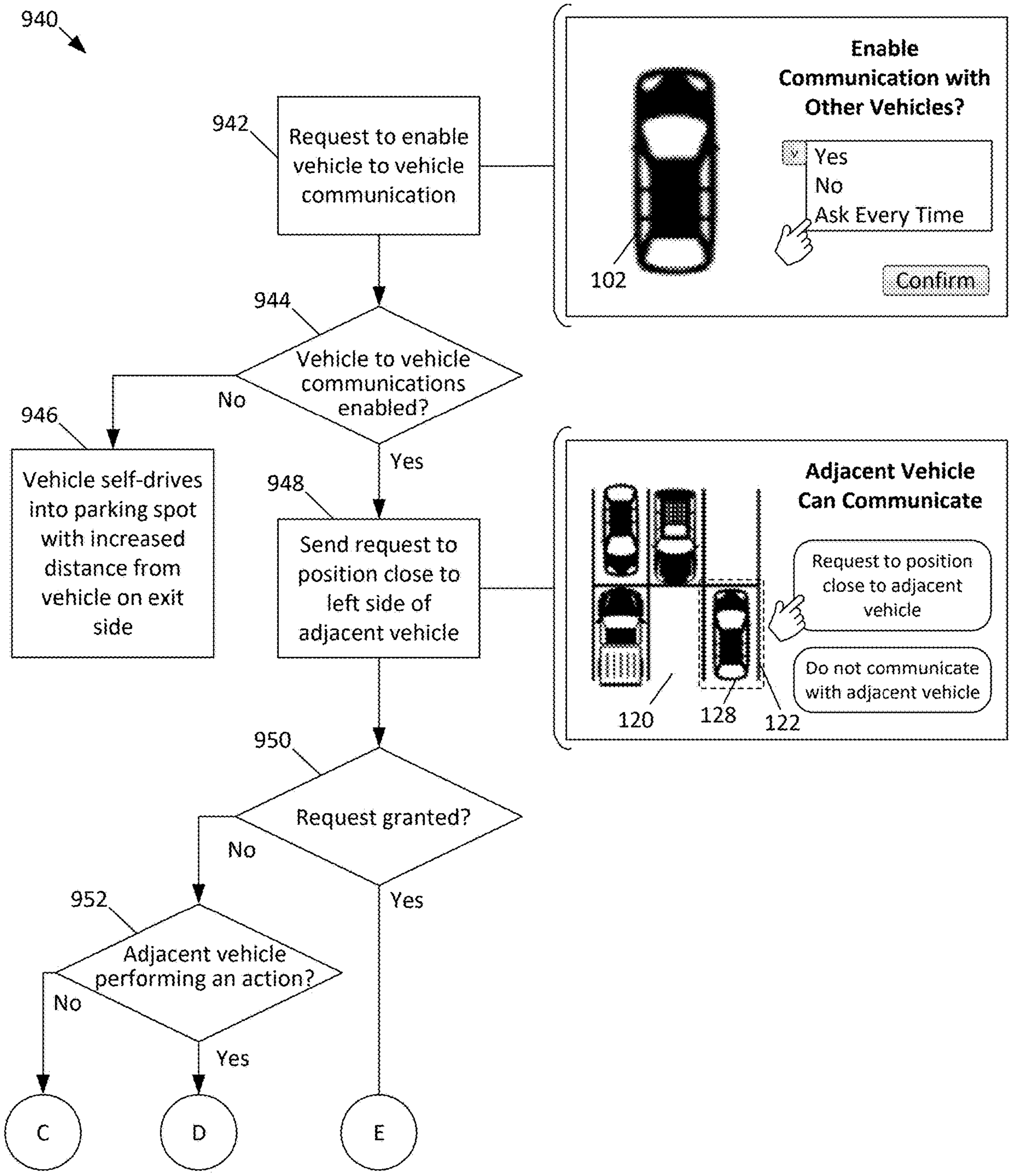
FIGS. 9A-9C are schematic illustrations of a process for using a system to communicate with an adjacent vehicle when positioning a vehicle during parking, in accordance with embodiments of the disclosure.
Figure 9B:
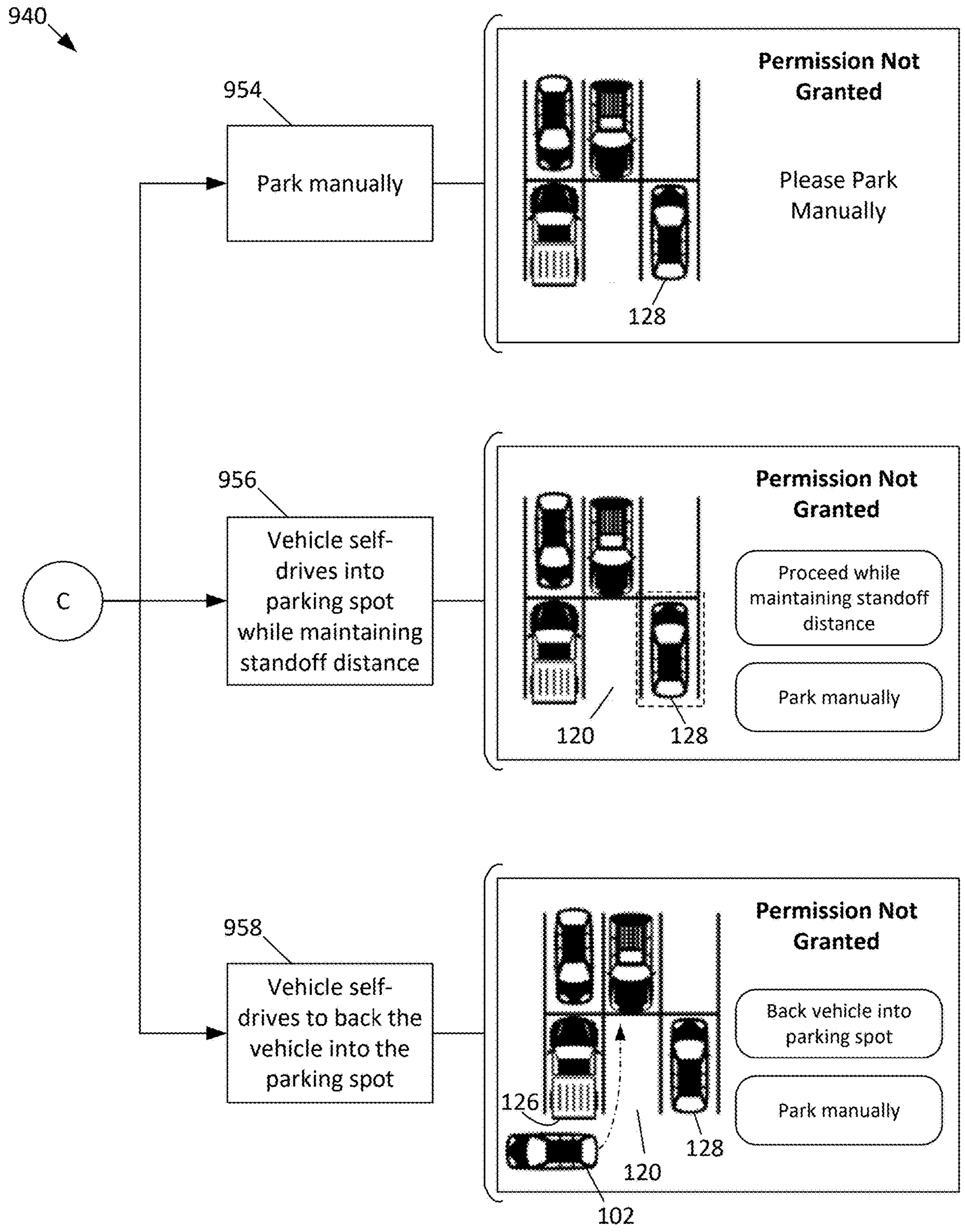
Figure 9C:
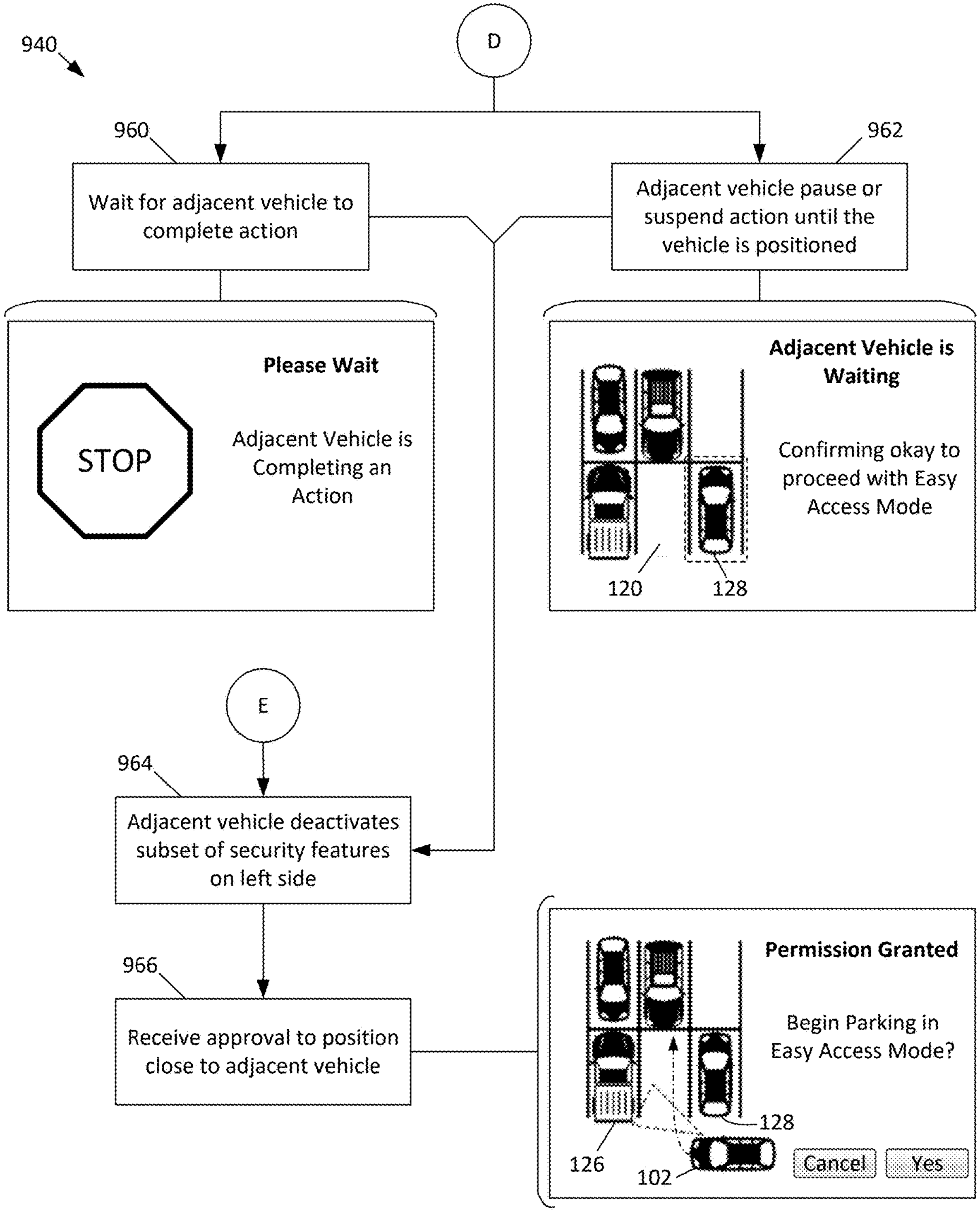

FIGS. 9A-9C are schematic illustrations of a process 940 for using a system (e.g., system 100 in FIG. 1A and easy access system 506 in FIGS. 5-6 and 11-14) to communicate with an adjacent car 128 when positioning the vehicle 102 during parking, in accordance with embodiments of the disclosure. The process 940 shown in FIG. 9 may be implemented, in whole or in part, by one or more systems or devices described herein.

Referring to FIG. 9A, the process 940 starts at operation 942 with control circuitry (e.g., control circuitry 190 discussed in FIG. 1A or control circuitry 1612, discussed below in relation to FIG. 16) receiving a request to enable vehicle to vehicle (V2V) communication. V2V communication systems allow vehicles to exchange information about their speed, direction, and location, enhancing situational awareness and reducing the risk of accidents. In some implementations, the control circuitry executes the vehicle interface application to receive the request. In the embodiment depicted in FIG. 9A, the request is received as user input through a GUI on a display screen of a user interface (e.g., user interface 110 in FIG. 1A, user interface 504 in FIGS. 5 and 12-14, and user input interface 1602, discussed below in relation to FIG. 16). The GUI displays the illustrative vehicle 102 on its left and configuration options for V2V communications on its right. The user input may be one of a "yes," "no," or "ask every time" option and a "confirm" button may be selected to send the V2V instruction to the control circuitry. In the embodiment depicted in FIG. 9A, a pointer is shown as selecting to ask every time.

The process 940 continues to operation 944 with the control circuitry determining whether V2V communications are enabled. If the determination is no, then the process 940 continues to operation 946 and the control circuitry directs the vehicle 102 to self-drive into the parking spot 120, such as discussed in relation to operation 152 in FIG. 1B. If the determination is yes, then the control circuitry continues to operation 948 and sends a request to the adjacent car 128 (e.g., by executing the vehicle communications application) to position the vehicle 102 close to the left side of the adjacent car 128. In the embodiment depicted in FIG. 9A, the control circuitry receives a request to position the vehicle 102 (e.g., by executing the vehicle interface application) as user input through a GUI that depicts the parking lot 122, parking spot 120, and adjacent car 128 on its left side and selection options on its right side. The selection options are used to indicate whether to communicate with the adjacent car 128 and include "request to position close to adjacent vehicle" and "do not communicate with adjacent vehicle." The request is sent to the adjacent car 128 if the request to position the vehicle 102 close to left side of the adjacent car 128 is selected.

The process 940 continues to operation 950 with the control circuitry determining whether the request was granted. If the determination is yes, then the process 940 continues operation 964, which is discussed below in relation to FIG. 9C. If the determination is no, then the process 940 continues to operation 952 with the control circuitry determining whether the adjacent car 128 is performing an action (e.g., parking, letting passengers access the car, or performing a smart summon).

If the determination at operation 952 is no, then the process continues to one of operations 954-958 discussed in relation to FIG. 9B. Referring to FIG. 9B, the process 940 may continue from operation 952 to operation 954 with the control circuitry directing the user to park manually, such as via a GUI displayed on the user interface. In one example, the GUI displays a message informing the user that the adjacent car 128 did not grant permission. The process 940 may continue from operation 952 to operation 956 with the control circuitry directing the vehicle 102 to self-drive into the parking spot 120 (e.g., by executing the vehicle element control application) while maintaining a standoff distance. For example, the control circuitry directs the vehicle 102 to self-drive as discussed in relation to operation 152 in FIG. 1B. In some implementations, the determination to self-drive results from a user input via a GUI displayed on the user interface. The GUI may present selection options such as "proceed while maintaining standoff distance" (selection of which would result in performance of operation 956) and "park manually" (selection of which would result in performance of operation 954). The process 940 may continue from operation 952 to operation 958 with the control circuitry directing the vehicle 102 to self-drive to back the vehicle 102 into the parking spot 120. For example, the control circuitry directs the vehicle 102 to self-drive as discussed in relation to operation 846 in FIG. 8A. In some implementations, the determination to self-drive rear first results from a user input via a GUI displayed on the user interface. In some implementations, the GUI presents selection options such as "back vehicle into parking spot" (selection of which would result in performance of operation 958) and "park manually." In some embodiments, the determination to self-drive rear first results from communicating with the adjacent truck 126. For example, if the adjacent car 128 did not grant permission, the control circuitry sends a request to the adjacent truck 126 to position the vehicle 102 close to the right side of the adjacent truck 126. If the request is granted, the control circuitry performs operation 958.

In some embodiments, the operation 954-958 is chosen by an input of a user. In some embodiments, the operation 954-958 are automatically chosen based on prior user input, such as user inputs of settings previously selected by the user. In some embodiments, the system chooses the "best" operation 954-958 to perform.

If the determination at operation 952 is yes, then the process 940 continues to one of operations 960-962 discussed in relation to FIG. 9C. Referring to FIG. 9C, the process 940 may continue from operation 952 to operation 960 with the control circuitry waiting for the adjacent car 128 to complete the action. In some implementations, a GUI is displayed on the user interface to notify the user to wait and that the adjacent car 128 is completing an action. In some embodiments, the control circuitry repositions the vehicle 102 to provide space for the adjacent car 128 to execute the action. For example, the control circuitry pulls the vehicle 102 forward or move the vehicle 102 backward in a driving lane of the parking lot 122 to allow the adjacent car 128 to exit its adjacent parking spot.

The process 940 may continue from operation 952 to operation 962 with the control circuitry receiving a communication from the adjacent car 128 (e.g., by executing the vehicle communications application). The communication informs the control circuitry that the adjacent car 128 has paused or suspended the action until the vehicle 102 is positioned in the parking spot 120. In some implementations, a GUI is displayed on the user interface to inform the user that the adjacent car 128 is waiting for the vehicle 102 to be positioned. The GUI displays an indication that the system is confirming the adjacent car 128 has granted permission to proceed with positioning the vehicle 102 in easy access mode.

The process 940 may continue from one of operations 950 (FIG. 9A), 960, or 962 to operation 964 with the control circuitry receiving a communication from the adjacent car 128 (e.g., by executing the vehicle communications application). The communication informs the control circuitry that the adjacent car 128 has modified (e.g., deactivated) a subset of security features on its left side. In some implementations, the security features include any one of an alarm (e.g., car alarm), warning (e.g., an auditory cue such as a siren, chirp, or utterance, or visual cue such as flashing lights), or notification (e.g., sent to device of the user of the vehicle 102 or of the adjacent car 128), The adjacent car 128 deactivates a subset of the security features on its left side to allow the vehicle 102 to be temporarily positioned close to adjacent car 128 and let passengers of the vehicle 102 exit on an opposite side (e.g., a side of the vehicle facing the adjacent truck 126). While the subset of the security features on the left side are deactivated, other subsets of security features on the left side may remain active. In some embodiments, the adjacent car 128 temporarily deactivates proximity sensors on its left side, but not any other side (e.g., front, rear, and right sides). In one example, bump sensors remain active on the left side to detect if the vehicle 102 hits the adjacent car 128. In some embodiments, the adjacent car 128 keeps the proximity sensors on its left side active and temporarily reduces a proximity distance threshold, which is used to activate its security features, for the proximity sensors on its left side. In one example, the adjacent vehicle 128 maintains security by distinguishing where the motion is happening in relation to the left side of the adjacent vehicle 128. In some embodiments, sensors on the right side of the adjacent vehicle 128 remain active and will still trigger the security features for events occurring on the right side. In some embodiments, the adjacent car 128 does not know what side the vehicle 102 will encroach. In some implementations, the adjacent car 128 identifies the presence of the vehicle 102 to be on the left side using sensors (e.g., proximity sensors).

The process 940 continues to operation 966 with the control circuitry receiving approval from the adjacent car 128 (e.g., by executing the vehicle communications application) to position the vehicle 102 close to the adjacent car 128. In some implementations, a GUI displays a "confirm" button for selection to begin execution of the easy access mode and a "cancel" button for selection to exit the easy access mode, such as discussed in relation to operation 150 in FIG. 1B. In some embodiments, the control circuitry sends a command to the adjacent car 128 to fold in its mirrors while the vehicle 102 is positioning in the parking spot 120. In some embodiments, the adjacent car 128 automatically folds in its mirrors. In some embodiments, the control circuitry folds in the mirrors of the vehicle 102 during or after positioning the vehicle 102 in the parking spot 120.

In some embodiments, the process 940 proceeds to other operations. For example, control circuitry positions the vehicle 102 in the parking spot 120 as discussed in relation to operation 152 in FIG. 1B. Once the vehicle 102 is parked, the adjacent car 128 again modifies (e.g., reactivate) the subset of security features on its left side.

Figure 10A:
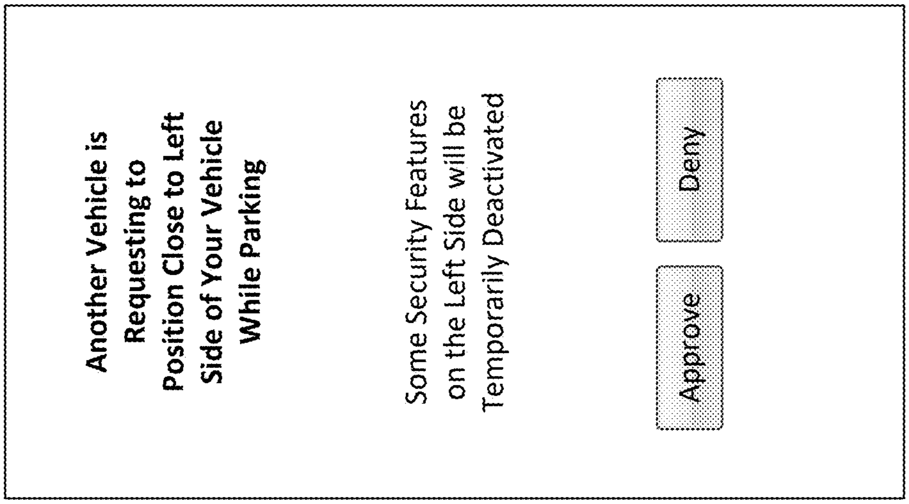
FIGS. 10A and 10B are representations of different graphical user interfaces of a device in communication with a system for positioning a vehicle during parking, in accordance with embodiments of the disclosure.
Figure 10B:
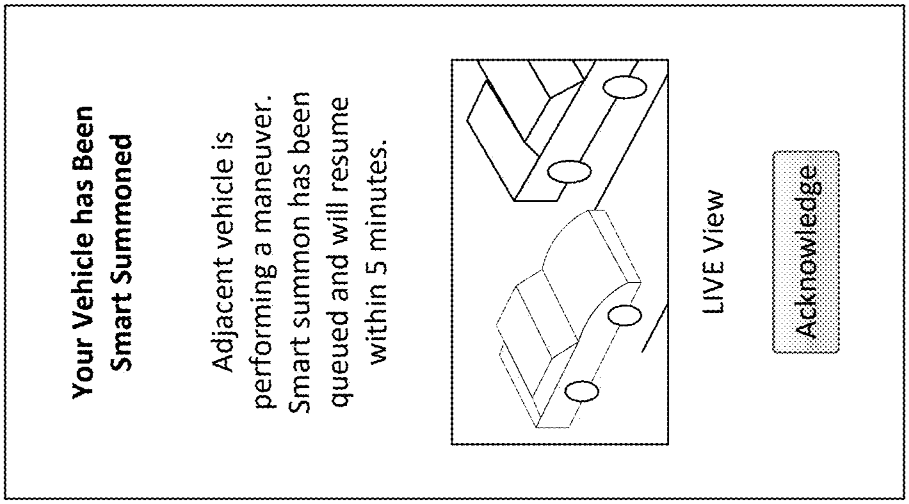

FIGS. 10A and 10B are representations of different GUIs of a device (e.g., wireless user communications device 1722, discussed below in relation to FIGS. 16 and 17) in communication with a system for positioning a vehicle during parking, in accordance with embodiments of the disclosure. In particular, the GUI of FIG. 10A may be used to modify a subset of security features of an adjacent vehicle (e.g., adjacent car 128 in FIG. 7). The GUI of FIG. 10B may be used to indicate an action of the adjacent vehicle is paused or suspended. In some implementations, the GUIs are presented on a display screen of the device. Thus, FIGS. 10A and 10B are described from the perspective of a device associated with the adjacent vehicle.

Referring to FIG. 10A, the GUI notifies a user (e.g., the driver of the adjacent car 128) that another vehicle (e.g., vehicle 102 in FIGS. 1A-4 and 8A-9C) is requesting to position close to the left side of the adjacent vehicle. The GUI, which may be displayed on the device of the user of the adjacent vehicle, notifies the user that some security features on the left side will be temporarily deactivated and provides selectable options to "approve" or "deny" the request. In some embodiments, the GUI in FIG. 10A is presented to the device of the user during operation 964 discussed in relation to FIG. 9C. In some embodiments, the GUI does not include the selectable options and is used to provide information to the user.

Referring to FIG. 10B, the GUI is presented to the user when the adjacent vehicle of the user is instructed to perform an action (e.g., the adjacent vehicle has been smart summoned). Another vehicle may inhibit performance of the action. The GUI notifies the user of the action to perform and that the another vehicle is performing a maneuver that inhibits the action. The GUI indicates that the requested action has been queued and, in some implementations, provides an estimated time to resume or initiate the requested action. If the adjacent vehicle includes a camera, then, in some implementations, the GUI provides images or video from the camera to show the another vehicle performing the maneuver. In some embodiments, the GUI in FIG. 10A is presented to the device of the user during operation 962 discussed in relation to FIG. 9C. In some embodiments, the GUI provides a notification that the another vehicle has completed performing the maneuver. In such embodiments, the GUI presents selectable options to "approve" or "deny" the adjacent vehicle to resume performing the action.

Figure 11:
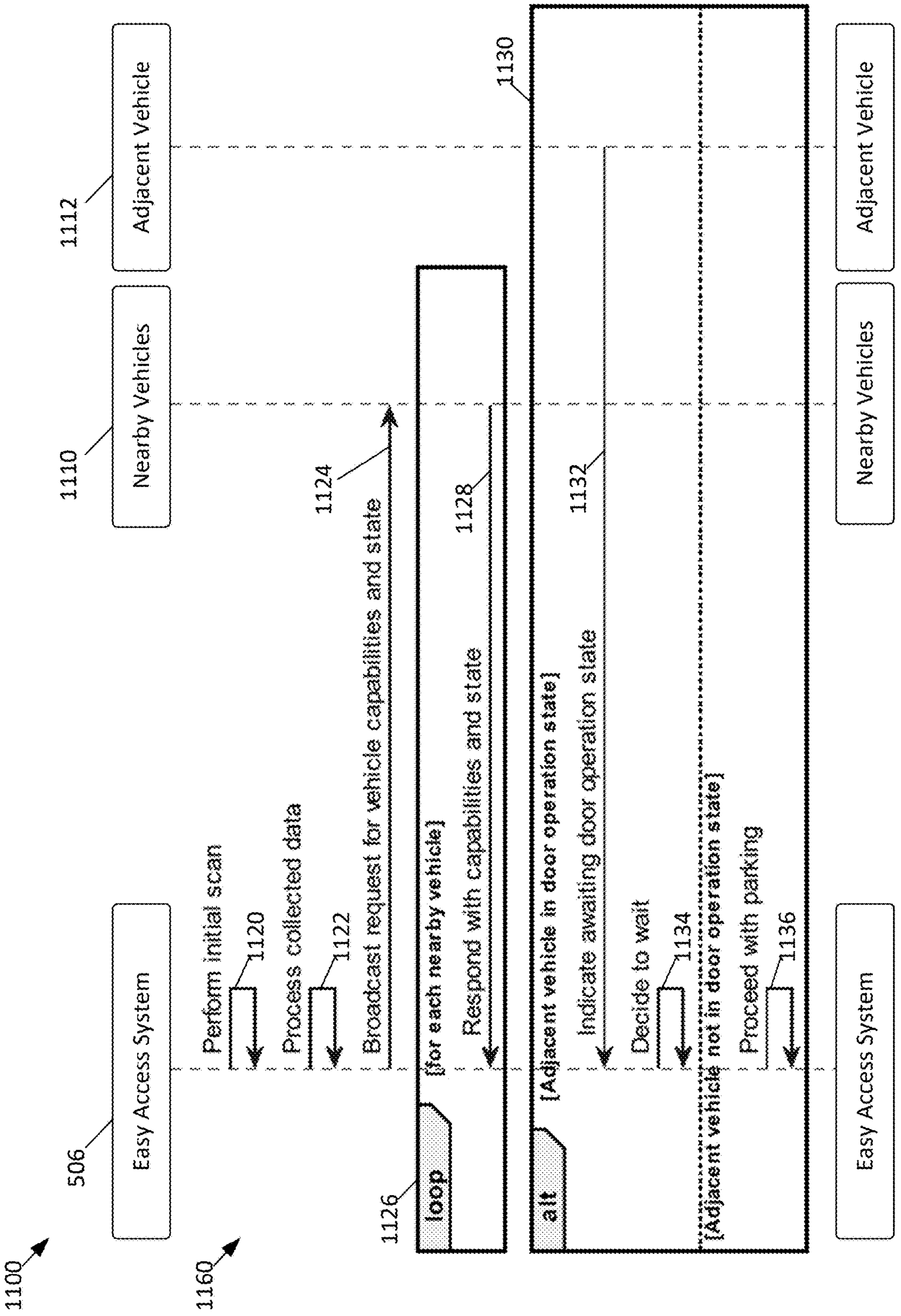
FIG. 11 illustrates an example sequence diagram defining communication between a system for positioning a vehicle during parking and nearby vehicles, in accordance with embodiments of the disclosure.

FIG. 11 illustrates an example sequence diagram 1100 defining communication (e.g., V2V communication) between the easy access system 506 for positioning a vehicle (e.g., vehicle 102 in FIGS. 1A-4 and 8A-9C) during parking and nearby vehicles 1110 (e.g., adjacent truck 126 in FIGS. 1A-2 and 8A-8C, adjacent car 128 in FIG. 7, and other vehicle shown in parking lot 122 in FIGS. 1A-2 and 7-9C), in accordance with embodiments of the disclosure.

The sequence diagram 1100 depicts messages between entities during a process 1160. The process 1160 may be implemented, in whole or in part, by one or more systems or devices described herein. The entities include the easy access system 506, the nearby vehicles 1110, and an adjacent vehicle 1112 (e.g., adjacent car 128 in FIG. 7). In some embodiments, the operations of the process 1160 are based on the result of operations 942 and 944 discussed in relation to FIG. 9A. For example, the operations are only be performed if V2V communications are enabled. The process 1160 includes the easy access system 506 performing 1120 an initial scan for vehicles capable of communicating. The easy access system 506 processes 1122 data collected from the initial scan. The easy access system 506 transmits 1124 a request for vehicle capabilities and/or operational state to the nearby vehicles 1110. The operation 1128 in loop box 1126 is repeated for each nearby vehicle. Each of the nearby vehicles 1110 transmits 1128 their capabilities and/or operational state to the easy access system 506. For example, the nearby vehicles communicate their parking status (e.g., recently parked) and door operation state (e.g., open and shut and pending or complete).

The operations 1132-1136 in alt box 1130 are based on the operational state of the adjacent vehicle 1112, which may be one of the nearby vehicles 1110. For example, the operational state of the adjacent vehicle 1112 is determined in operation 952 discussed in relation to FIG. 9A. If the adjacent vehicle 1112 is in an active door operation state (e.g., door is opened or in process of opening or closing), then the adjacent vehicle 1112 transmits 1132 an indication that it is awaiting completion of the door operation state to the easy access system 506. The easy access system 506 decides 1134 to wait for the adjacent vehicle 1112 to complete the door operation state. For example, the easy access system 506 waits as discussed in relation to operation 960 discussed in relation to FIG. 9C. If the adjacent vehicle 1112 is not in an active door operation state then the easy access system 506 proceeds 1136 with positioning the vehicle closer to the adjacent vehicle 1112 to let passengers safely and comfortably exit. For example, the easy access system 506 positions the vehicle as discussed in relation to operation 152 in FIG. 1B.

In some embodiments, the easy access system 506 positions the vehicle at a minimum predetermined distance from the adjacent vehicle 1112. For example, the minimum predetermined distance is a distance that ensures the vehicle does not contact the adjacent vehicle 1112. In some embodiments, the minimum predetermined distance is a distance that ensures an alarm or security features of the adjacent vehicle 1112 are not activated. In some implementations, the minimum predetermined distance is at least 0.25 feet, such as at least 0.5 feet, such as at least 0.75 feet, such as at least 1 foot. In some embodiments, the minimum predetermined distance is a distance that positions the vehicle at or on a border of a parking spot (e.g., parking spot 120 in FIGS. 1A-2 and 8A-9C) in which the vehicle is being positioned.

In some embodiments, the easy access system 506 decides to wait until the adjacent vehicle 1112 transmits an indication that the door operation state is complete. In some embodiments, the easy access system 506 decides to wait for a predetermined time before retransmitting 1124 the request for vehicle capabilities and/or operational state to at least the adjacent vehicle 1112. In some embodiments, the adjacent vehicle 1112 pauses or suspends the current or planned operational state, such as discussed in relation to operation 962 in FIG. 9C, to allow the vehicle to proceed with parking.

Figure 12:
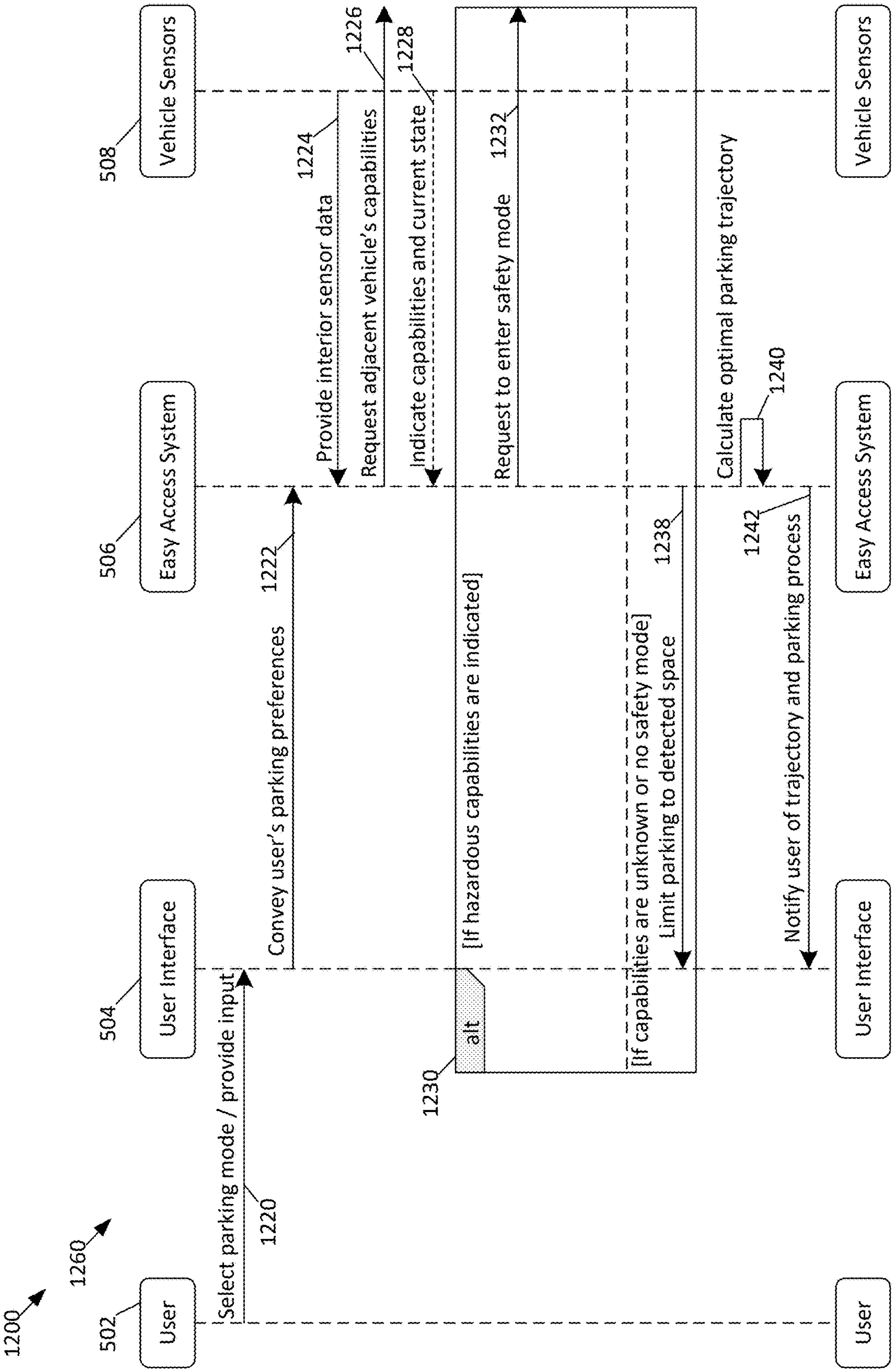
FIG. 12 illustrates an example sequence diagram defining communication to coordinate between a system for positioning a vehicle during parking and an adjacent vehicle, in accordance with embodiments of the disclosure.
Figure 12:
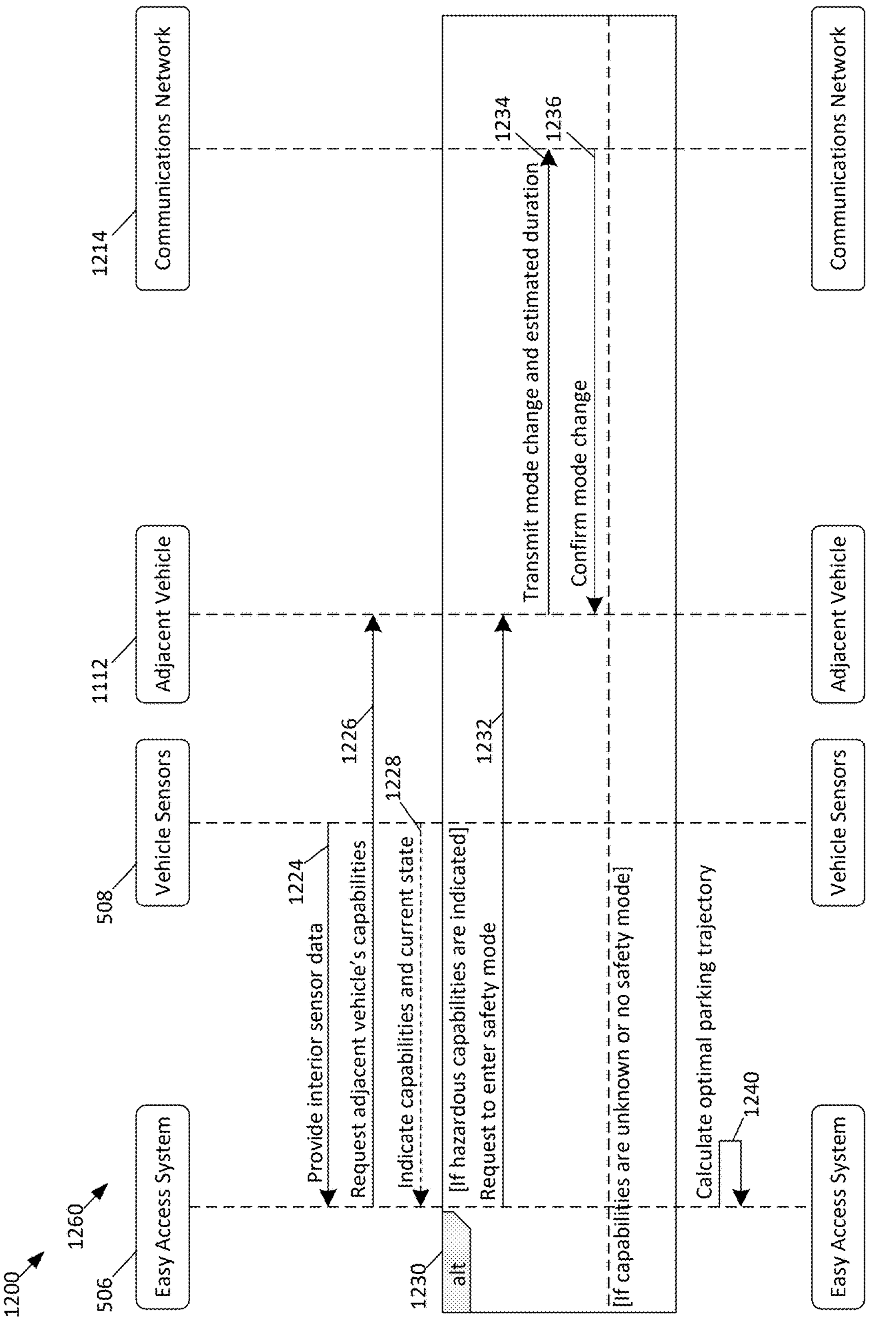

FIG. 12 illustrates an example sequence diagram 1200 defining communication to coordinate between the easy access system 506 for positioning a vehicle (e.g., vehicle 102 in FIGS. 1A-4 and 8A-9C) during parking and the adjacent vehicle 1112, in accordance with embodiments of the disclosure.

The sequence diagram 1200 depicts messages between entities during a process 1260. The process 1260 may be implemented, in whole or in part, by one or more systems or devices described herein. The entities include the user 502, the user interface 504, the easy access system 506, the vehicle sensors 508, the adjacent vehicle 1112, and a communications network 1214 (or, e.g., communications network 1710, discussed below in relation to FIG. 17). The process 1260 includes the user 502 selecting 1220 a parking mode and/or providing input to the user interface 504. For example, the user makes selections via the GUIs discussed in relation to FIGS. 3A-3C. The user interface 504 communicates 1222 the parking mode and/or input to the easy access system 506. The vehicle sensors 508 send 1224 sensor data to the easy access system 506. The vehicle sensors 508 send 1224 sensor data from vehicle sensors 508 corresponding to the interior of the vehicle to the easy access system 506. The easy access system 506 transmits 1226 a request for the capabilities of the adjacent vehicle 1112. In some embodiments, communication with the adjacent vehicle 1112 is only performed if V2V communications are enabled as discussed in relation to FIGS. 9A and 11. The adjacent vehicle 1112 transmits 1228 an indication of capabilities and/or the current operational state to the easy access system 506.

The operations 1232-1238 in alt box 1230 are based on the capabilities of the adjacent vehicle 1112. If the adjacent vehicle 1112 is capable of functions or modes that interfere with the positioning of the vehicle during the easy access system 506 (e.g., smart summon or automatic door opening), then the easy access system 506 transmits 1232 a request for the adjacent vehicle 1112 to enter a safety mode. The adjacent vehicle 1112 transmits 1234 an indication of the mode change and estimated duration for the change to a communications network 1214. The communications network 1214 confirms 1236 the mode change. In some embodiments, the communications network 1214 communicates to a device of a user (e.g., wireless user communications device 1722, discussed below in relation to FIGS. 16 and 17) of the adjacent vehicle 1112. In one example, the messages transmitted to and received by the communications network 1214 are also transmitted to and received by the device of the user of the adjacent vehicle 1112. In some embodiments, the GUI shown in FIG. 10B are displayed on the device of the user of the adjacent vehicle 1112 in response to the received transmission indicating the mode change of the adjacent vehicle 1112. If the adjacent vehicle 1112 is not capable of functions or modes that interfere with the positioning of the vehicle during the easy access system 506, or if the capabilities of the adjacent vehicle 1112 are unknown, the easy access system 506 constraints 1238 positioning of the vehicle to the detected parking space.

The easy access system 506 calculates 1240 the optimal parking trajectory for positioning the vehicle. For example, the easy access system 506 determines the trajectory as discussed in relation to operation 150 in FIG. 1B. The easy access system 506 sends 1242 a notification containing the trajectory and positioning of the vehicle to the user interface 504. In some embodiments, the user interface 504 generates for display on the user interface 504 (e.g., to the user 502), the trajectory and positioning of the vehicle.

Figure 13:
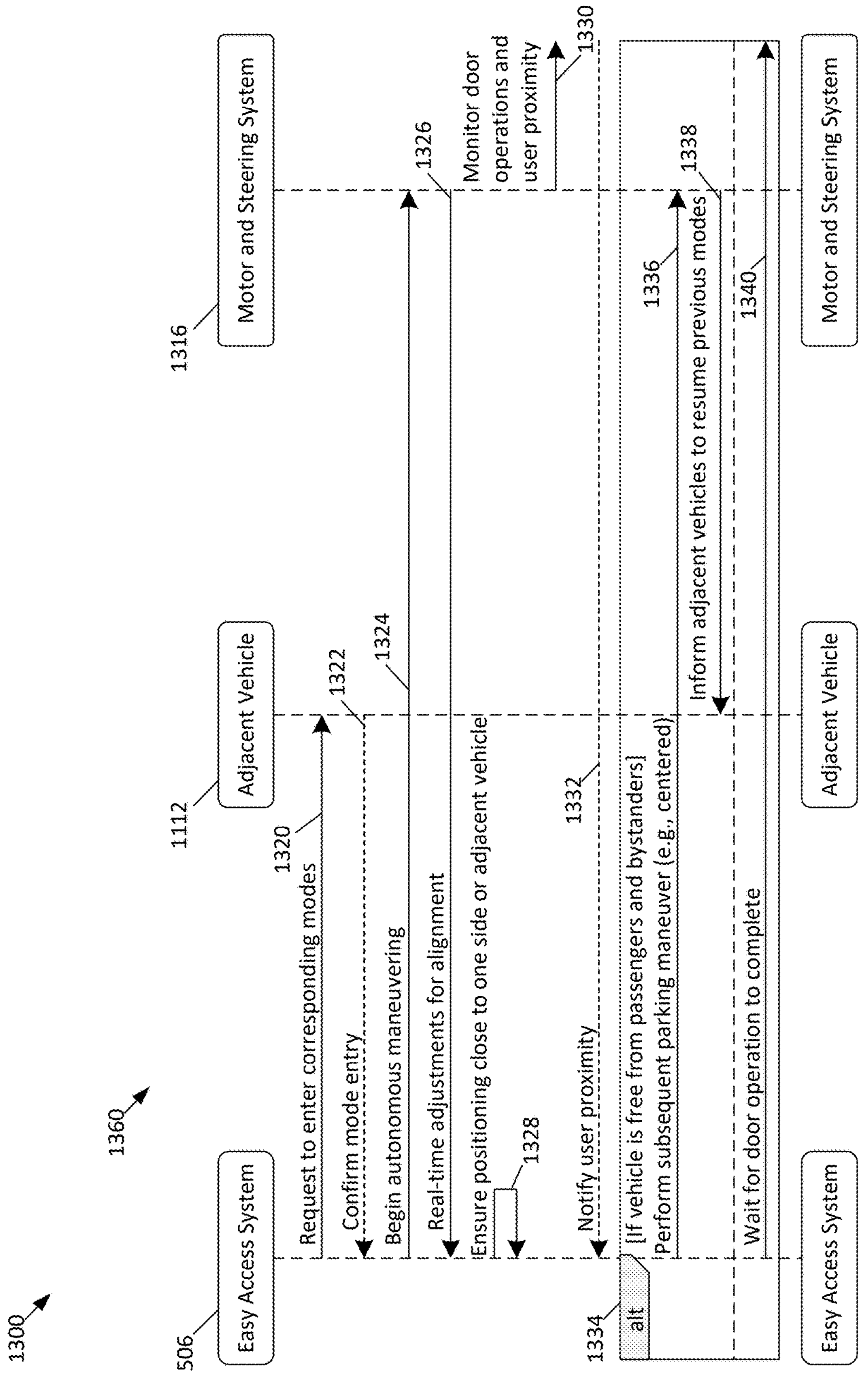
FIG. 13 illustrates an example sequence diagram defining communication between a system for positioning a vehicle during parking and an adjacent vehicle, in accordance with embodiments of the disclosure.
Figure 13:
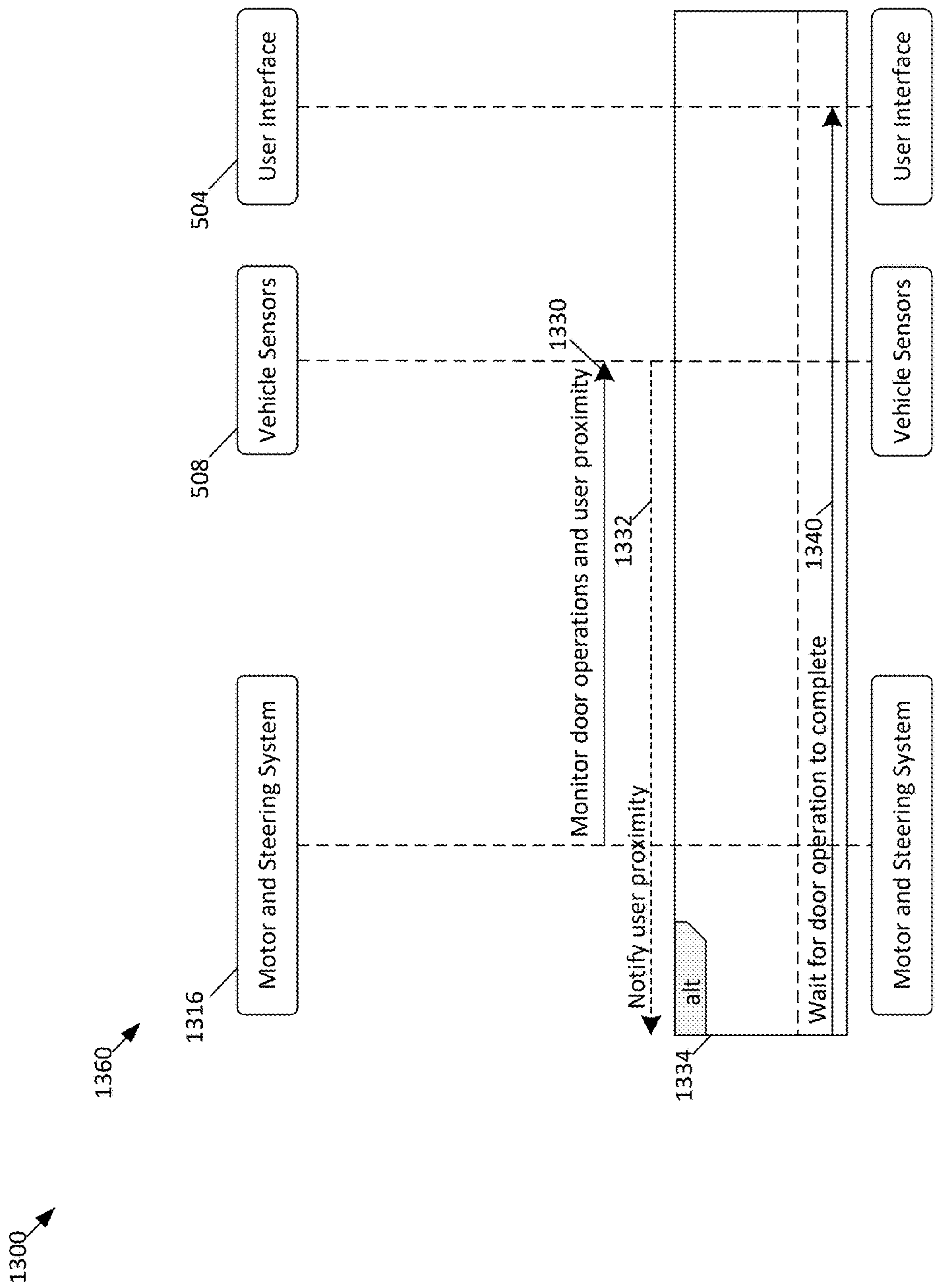

FIG. 13 illustrates an example sequence diagram 1300 defining communication between the easy access system 506 for positioning a vehicle (e.g., vehicle 102 in FIGS. 1A-4 and 8A-9C) during parking and the adjacent vehicle 1112, in accordance with embodiments of the disclosure.

The sequence diagram 1300 depicts messages between entities during a process 1360. The process 1360 may be implemented, in whole or in part, by one or more systems or devices described herein. The entities include the user interface 504, the easy access system 506, the vehicle sensors 508, the adjacent vehicle 1112, and a motor and steering control system(s) 1316. The process 1360 includes the easy access system 506 transmitting 1320 a request to enter corresponding modes to the adjacent vehicle 1112. For example, the adjacent vehicle 1112 modifies (e.g., deactivate) a subset of its security features as discussed in relation to operation 964 in FIG. 9C. In some embodiments, the GUI shown in FIG. 10A is displayed on a device of the user (e.g., wireless user communications device 1722, discussed below in relation to FIGS. 16 and 17) of the adjacent vehicle 1112 in response to the request to enter corresponding modes. The adjacent vehicle 1112 transmits 1322 a confirmation of entry of the corresponding mode to the easy access system 506. For example, the adjacent vehicle 1112 transmits approval or confirmation to the easy access system 506 to proceed with parking as discussed in relation to operation 966 in FIG. 9C. The easy access system 506 sends 1324 a request to begin autonomous maneuvering of the vehicle to the motor and steering control system(s) 1316. The motor and steering control system(s) 1316 sends 1326 real-time adjustments for alignment to the easy access system 506. The easy access system 506 ensures 1328 the vehicle is positioned close to a side of the adjacent vehicle 1112. For example, the easy access system 506 positions the vehicle as discussed in relation to operation 152 in FIG. 1B. Once positioned, the motor and steering control system(s) 1316 sends 1330 a request to the vehicle sensors 508 to monitor operation of the doors of the vehicle and monitor the proximity of a user (e.g., user 502 in FIGS. 5-6 and 12) to the vehicle. The vehicle sensors 508 send 1332 sensor data indicating the proximity of the user to the adjacent vehicle 1112 to the vehicle sensors 508.

The operations 1336-1340 in alt box 1334 are based on whether the vehicle is free from passengers and bystanders. For example, the easy access system 506 determines whether the vehicle is free from passengers or bystanders as discussed in relation to the GUI in FIG. 4A and/or operations 744-746 in FIG. 7. If the vehicle is free from passengers and bystanders, the easy access system 506 sends 1336 a request to perform a subsequent parking maneuver to the motor and steering control system(s) 1316. For example, the easy access system 506 positions the vehicle, via the motor and steering control system(s) 1316, as discussed in relation to operation 158 in FIG. 1C. In some embodiments, the subsequent parking maneuver positions the vehicle at least a predetermined distance (e.g., distance d2 in FIG. 1C) away from the adjacent vehicle 1112. In some embodiments, the subsequent parking maneuver centers the vehicle in the parking spot or between adjacent vehicles 1112. The motor and steering control system(s) 1316 transmits 1338 a message indicating permission to resume the previous mode to the adjacent vehicle 1112. The easy access system 506 sends 1340 a notification to wait for operation of the doors to complete to the user interface 504.

Figure 14:
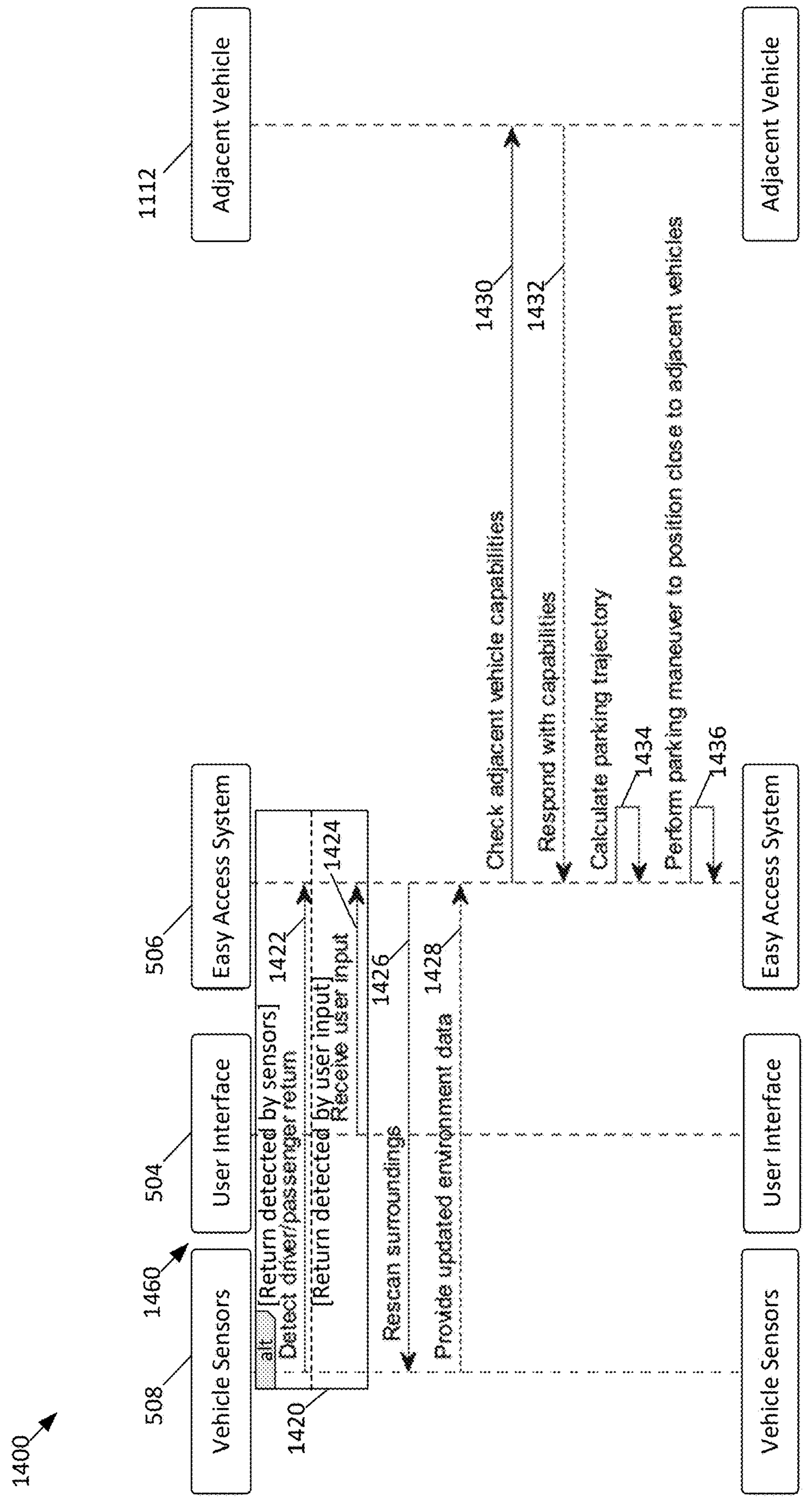
FIG. 14 illustrates an example sequence diagram defining communication to coordinate between a system for positioning a vehicle to load passengers and an adjacent vehicle, in accordance with embodiments of the disclosure.

FIG. 14 illustrates an example sequence diagram 1400 defining communication to coordinate between the easy access system 506 for positioning a vehicle (e.g., vehicle 102 in FIGS. 1A-4 and 8A-9C) to load passengers and the adjacent vehicle 1112, in accordance with embodiments of the disclosure.

The sequence diagram 1400 depicts messages between entities during a process 1460. The process 1460 may be implemented, in whole or in part, by one or more systems or devices described herein. The entities include the user interface 504, the easy access system 506, the vehicle sensors 508, and the adjacent vehicle 1112. The process 1460 begins at conditional operations 1422-1424 in alt box 1420 when return of a user (e.g., user 502 in FIGS. 5-6 and 12) to the vehicle is detected. In some embodiments, the return of the user is detected as discussed in relation to operation 244 of FIG. 2. If the return of the user is detected by vehicle sensors 508, then the vehicle sensors 508 send 1422 sensor data indicating the user has returned or is returning to the vehicle to the easy access system 506. For example, the easy access system 506 automatically determines that the user has returned as discussed in relation to operations 242-244 in FIG. 2. If the return of the user is detected by user input, then the user interface 504 sends 1424 an indication that the user has returned or is returning to the vehicle to the easy access system 506. For example, the user interface 504 receives input from the user via the GUIs discussed in relation to FIGS. 4B and 4C.

The easy access system 506 sends 1426 a request to rescan the surroundings to the vehicle sensors 508. The vehicle sensors 508 send 1428 sensor data indicating the updated surroundings to the easy access system 506. The easy access system 506 transmits 1430 a request for the capabilities and/or the current operational state of the adjacent vehicle 1112. The adjacent vehicle 1112 transmits 1432 an indication of capabilities and/or the current operational state to the easy access system 506. The easy access system 506 calculates 1434 the optimal parking trajectory for positioning the vehicle. For example, the easy access system 506 determines the trajectory as discussed in relation to operation 150 in FIG. 1B. In some embodiments, the easy access system 506 sends a notification containing the trajectory and positioning of the vehicle to the user interface 504, which may display the trajectory. The easy access system 506 proceeds 1436 with positioning the vehicle close to the adjacent vehicle 1112 to let passengers safely enter. For example, the easy access system 506 positions the vehicle as discussed in relation to operation 250 in FIG. 2. In some embodiments, the easy access system 506 positions the vehicle at a minimum predetermined distance from the adjacent vehicle 1112, such as discussed in relation to FIGS. 1C and 11.

Figure 15:
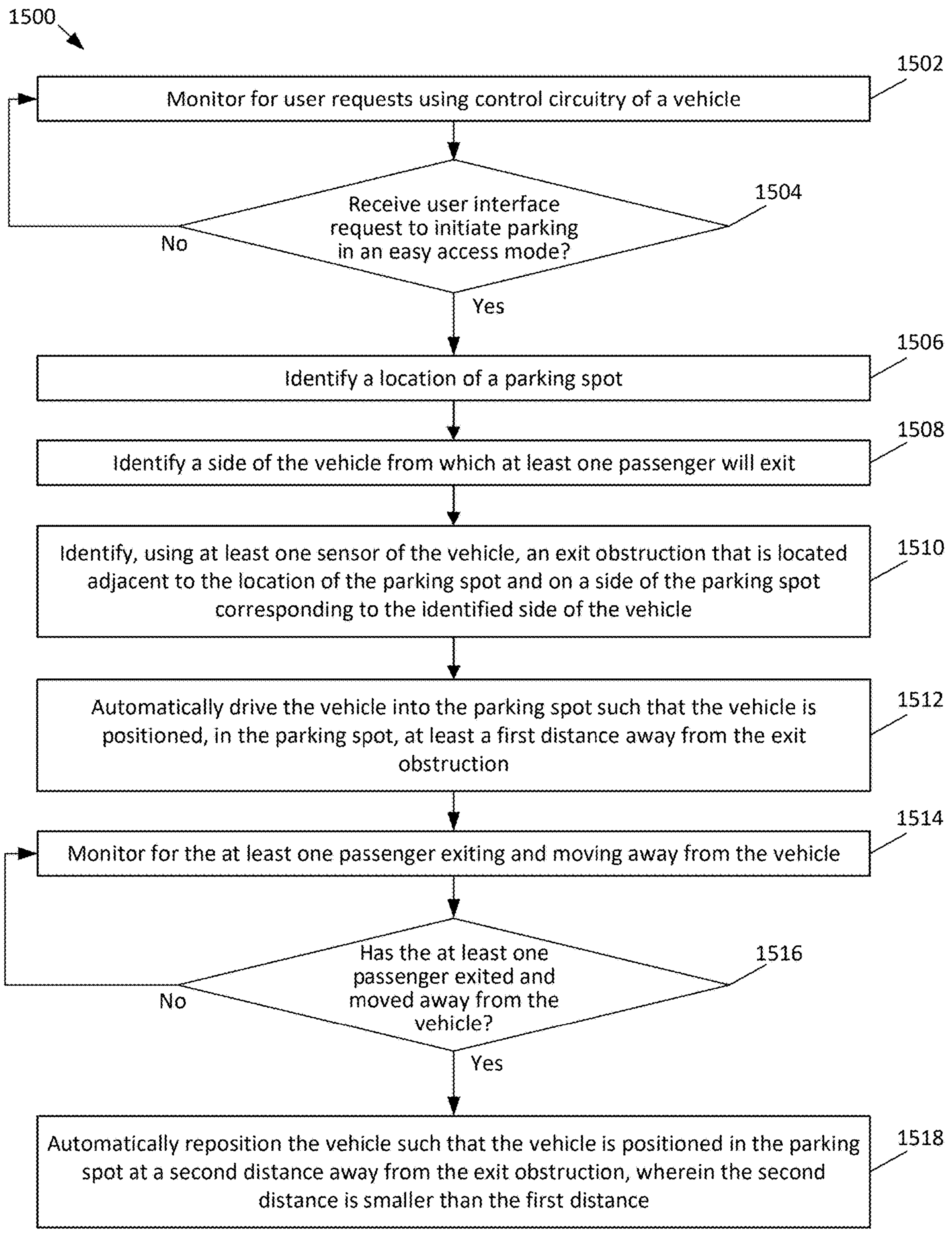
FIG. 15 is a schematic illustration of a process for positioning a vehicle during parking to allow passengers to safely exit the vehicle, in accordance with embodiments of the disclosure.

FIG. 15 is a schematic illustration of a process 1500 for positioning a vehicle (e.g., vehicle 102 in FIGS. 1A-4 and 8A-9C) during parking to allow passengers to safely exit the vehicle, in accordance with embodiments of the disclosure. The process 1500 shown in FIG. 15 may be implemented, in whole or in part, by one or more systems or devices described herein. In some embodiments, instructions for applications that control the vehicle are stored in non-transitory memory, such as discussed in relation to FIG. 1A, and when executed, perform operations of the process 1500.

The process 1500 begins at operation 1502 with control circuitry (e.g., control circuitry 190 discussed in FIG. 1A or control circuitry 1612, discussed below in relation to FIG. 16) of the vehicle monitoring for user requests.

The process 1500 continues to operation 1504 with the control circuitry determining if a user interface request to initiate parking in an easy access mode was received, such as described above with respect to FIGS. 1A and 5. For example, the control circuitry receives a request to enable the easy access mode from a GUI displayed on the user interface, as discussed in relation to operation 144 in FIG. 1A. In some embodiments, I/O circuitry (e.g., I/O circuitry 192 in FIG. 1A and I/O path 1616, discussed below in relation to FIG. 16) receives the request.

If the determination at operation 1504 is no, the process 1500 proceeds to operation 1502. If the determination at operation 1504 is yes, the process continues to operation 1506 with the control circuitry identifying a location of a parking spot (e.g., parking spot 120 in FIGS. 1A-2 and 8A-9C), such as discussed in relation to FIGS. 1A and 6.

The process 1500 continues to operation 1508 with the control circuitry identifying a side of the vehicle from which at least one passenger will exit, such as discussed in relation to FIG. 1A.

The process 1500 continues to operation 1510 with the control circuitry identifying, using at least one sensor (e.g., sensors 108 in FIG. 1A and sensors 1608, discussed below in relation to FIG. 16) of the vehicle, an exit obstruction (e.g., adjacent truck 126 in FIGS. 1A-2 and 8A-8C or adjacent car 128 in FIG. 7) that is located adjacent to the location of the parking spot and on a side of the parking spot corresponding to the identified side of the vehicle, such as discussed in relation to FIG. 1B. In some embodiments, at least one of, or all of operations 1506-1510 are performed in response to the request to initiate parking in easy access mode.

The process 1500 continues to operation 1512 with the control circuitry automatically driving the vehicle into the parking spot such that the vehicle is positioned, in the parking spot, at least a first distance away from the exit obstruction, such as discussed in relation to FIG. 1B. In some embodiments, the control circuitry automatically drives the vehicle in response to identifying the exit obstruction. In some embodiments, the control circuitry directs the vehicle to automatically drive into the parking spot.

The process 1500 continues to operation 1514 with the control circuitry monitoring for the at least one passenger exiting and moving away from the vehicle, such as discussed in relation to FIGS. 1C and 2 and 7-8C.

The process 1500 continues to operation 1516 with the control circuitry determining whether the at least one passenger has exited and moved away from the vehicle, such as discussed in relation to FIGS. 1C and 2 and 7-8C. If the determination is no, then the process 1500 continues to operation 1514. If the determination is yes, then the process 1500 continues to operation 1518 with the control circuitry automatically repositioning the vehicle such that the vehicle is positioned in the parking spot at a second distance away from the exit obstruction, wherein the second distance is less than the first distance, such as discussed in relation to FIGS. 1C, 4A, and 7-8B.

FIG. 16 depicts example devices and related hardware for receiving input from a user input interface 1602 (or, e.g., user interface 110 in FIG. 1A and user interface 504 in FIGS. 5 and 12-14) and positioning a vehicle (e.g., vehicle 102 in FIGS. 1A-4 and 8A-9C) during parking to allow passengers to safely access the vehicle based on the input, in accordance with some embodiments of this disclosure. FIG. 16 shows a generalized embodiment of illustrative vehicle computing device 1600 that may be used as part of a system (e.g., system 100 in FIG. 1A and easy access system 506 in FIGS. 5-6 and 11-14). In some implementations, vehicle computing device 1600 receives data via I/O path 1616, and processes input data and output data using I/O circuitry (e.g., I/O circuitry 192 in FIG. 1A). In one example, I/O path 1616 provides content (e.g., data structures, user profile information, Internet content, content available over a local area network (LAN) or wide area network (WAN), and/or other content) and data (e.g., data structures, data from sensors 1608) to control circuitry 1612, which includes processing circuitry 1610 and storage 1614. In some implementations, control circuitry 1612 is used to send and receive commands, requests, and other suitable data using I/O path 1616. In some implementations, vehicle computing device 1600 includes and/or interfaces with vehicle elements, such as a drive system 1620, steering system 1622, speakers 1624, and lights 1626 of the vehicle.

In some embodiments, control circuitry 1612 is based on any suitable processing circuitry such as processing circuitry 1610. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry 1610 is distributed across multiple separate processors or processing units. In some embodiments, control circuitry 1612 executes instructions for multiple applications stored in non-transitory memory (i.e., storage 1614). Specifically, control circuitry 1612 may be instructed by a vehicle element control application, vehicle interface application, or vehicle communications application, to name a few examples, to perform the functions discussed in this disclosure. For example, the vehicle element control application provides instructions to control circuitry 1612 to identify a parking spot, drive the vehicle, direct the vehicle to self-drive, communicate with passengers of the vehicle, or execute a received input from I/O path 1616. In some implementations, any action performed by control circuitry 1612 is based on instructions received from the vehicle element control application.

In some client/server-based embodiments, control circuitry 1612 includes communications circuitry suitable for communicating with an application server or other networks or servers. In one example, the instructions for carrying out the above-mentioned functionality are stored on the application server. Communications circuitry may include SATCOM, a 5G or 6G modem, a cable modem, an integrated-services digital network (ISDN) modem, a digital subscriber line (DSL) modem, a telephone modem, Ethernet card, a wireless modem, and/or one or more CAN busses or Ethernet transceivers for communications with other equipment, or any other suitable communications circuitry. Such communications may involve the Internet or any other suitable communications networks or paths (which are described in more detail in connection with FIG. 17). In some implementations, any action performed by communications circuitry is based on instructions received from the vehicle communications application.

In some embodiments, the sensors 1608 are arranged inside and/or outside of the vehicle. In some embodiments, the sensors 1608 are provided in the vehicle computing device 1600. In one example, the sensors 1608 are used for capturing any data described herein, generating various data, and making various determinations and identifications as discussed in this disclosure. The sensors 1608 may include various sensors, such as one or more ultrasonic sensors, cameras, radar, and lidar to provide awareness of the vehicle's surroundings. For example, the sensors 1608 are used by the control circuitry 1612 to (i) identify a location of a parking spot, (ii) identify an exit obstruction, and (iii) determine the position of the exit obstruction in relation to the vehicle. The sensors 1608 may include occupancy sensors, such as passive infrared sensors (PIR), ultrasonic sensors, cameras, pressure or weight sensors, and seat buckle sensors, to determine if a passenger occupies a seat of the vehicle. The sensors 1608 may also include sensor circuitry which enables the sensors 1608 to operate and receive and transmit data, to and from, the control circuitry 1612 and various other components of the vehicle computing device 1600. In addition, communications circuitry may include circuitry that enables peer-to-peer communication of user equipment devices, or communication of user equipment devices in locations remote from each other (described in more detail below).

In some embodiments, memory is an electronic storage device provided as storage 1614 that is part of control circuitry 1612. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1614 may be used to store various types of content described herein as well as content data and application data that are described above. In some implementations, nonvolatile memory is also used (e.g., to launch a boot-up routine and other instructions). In some implementations, cloud-based storage is used to supplement storage 1614 or instead of storage 1614.

In some embodiments, sensors 1608 and/or control circuitry 1612 include digital-to-analog converter circuitry and analog-to-digital converter circuitry for converting between digital and analog signals.

The multiple applications may be implemented using any suitable architecture. For example, each application is a stand-alone application wholly implemented on vehicle computing device 1600. In such an approach, instructions of the applications are stored locally (e.g., in storage 1614), and data for use by the applications is downloaded on a periodic basis (e.g., from an out-of-band feed, from an Internet resource, or using another suitable approach). In some embodiments, control circuitry 1612 retrieves instructions of the application from storage 1614 and process the instructions to carry out any of the functions discussed herein. Based on the processed instructions, control circuitry 1612 determines what action to perform when input is received from user input interface 1602. For example, a request to perform an action to drive the vehicle is indicated by the processed instructions when the user input interface 1602 indicates that a user input indicates to begin parking in an easy access mode. In some examples, a vehicle includes multiple electronic control units (ECUs) used in conjunction to achieve one or more functions. For example, the sensors 1608 are fitted with their own processing circuitry (similar to processing circuitry 1610) and storage (similar to storage 1614) and communicate via an I/O path (similar to I/O path 1616) to another processing circuitry and/or storage. Similarly, in some implementations, sensors 1608 and user input interface 1602 are connected to another processing circuitry and/or storage. This architecture enables various components to be separated and may segregate functions to provide failure separation and redundancy. In some embodiments, the user input interface 1602 includes a user device, such as wireless user communications device 1722 discussed below in relation to FIG. 17.

In some embodiments, the multiple applications are client/server-based applications. Data for use by a thick or thin client implemented on vehicle computing device 1600 is retrieved on-demand by issuing requests to a server remote to the vehicle computing device 1600. In one example of a client/server-based application, control circuitry 1612 runs a web browser that interprets web pages provided by a remote or edge server. For example, the remote server stores the instructions for the application in a storage device. The remote server processes the stored instructions using circuitry (e.g., control circuitry 1612) and carry out one or more of the functions discussed herein. The client device receives data from the remote server and also carries out one or more of the functions discussed herein locally on vehicle computing device 1600. This way, the processing of the instructions is performed at least partially remotely by the server while other functions are executed locally on vehicle computing device 1600. In some embodiments, vehicle computing device 1600 receives inputs from the user or occupant of the vehicle via user input interface 1602 and transmit those inputs to the remote server for processing. For example, vehicle computing device 1600 transmits, via one or more antenna, communication to the remote server, indicating that a user interface element was selected via user input interface 1602. The remote server processes instructions in accordance with that input and generate a display of content identifiers associated with the selected user interface element. The generated display is then transmitted to vehicle computing device 1600 for presentation to the user or occupant of the vehicle.

In some embodiments, at least one of the multiple applications is downloaded and interpreted or otherwise run by an interpreter or virtual machine (run by control circuitry 1612). In some implementations, the at least one application operates in connection with or as a part of an electronic control unit (ECU) of a vehicle. In one example, the ECU is one of many ECUs of the vehicle, wherein each ECU operates to control a particular set of functions of the vehicle, such as engine controls, power train controls, transmission controls, brake controls, etc. The at least one application operates in connection with one or more ECUs of the vehicle in order to carry out the functions described herein.

Figure 17:
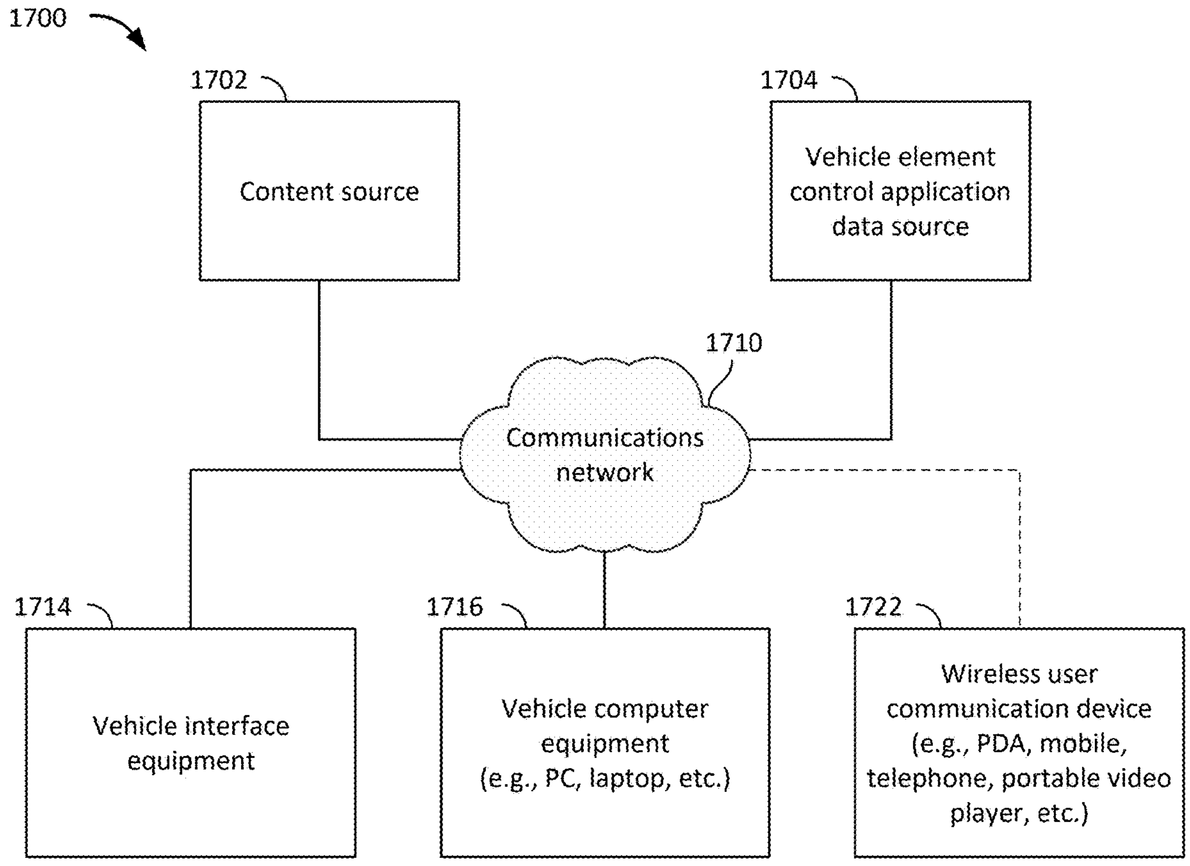
FIG. 17 depicts example systems, servers, and related hardware for enabling a vehicle element control application to carry out the functions described herein, in accordance with some embodiments of this disclosure.

Vehicle computing device 1600 of FIG. 16 can be implemented in system 1700 of FIG. 17 as vehicle interface equipment 1714, vehicle computer equipment 1716, wireless user communications device 1722, or any other type of user equipment. For simplicity, these devices may be referred to herein collectively as interface equipment or interface equipment devices and may be substantially similar to the vehicle computing device 1600 described above. In some embodiments, the vehicle computer equipment 1716, which includes the control circuitry 1612, the I/O path 1616, and storage 1614 discussed in relation to FIG. 16, communicates over the communication network 1710 (or, e.g., communications network 1214 in FIG. 12) with a server to send and receive data from the vehicle element control application data source 1704, data from other vehicles (e.g., adjacent car 128 in FIGS. 9A-9C and adjacent vehicle 1112 in FIGS. 11-14), and any other necessary data. Interface equipment devices, on which one or more functions of multiple applications described herein may be implemented, may function as stand-alone devices or may be part of a network of devices. Various network configurations of devices may be implemented and are discussed in more detail below.

FIG. 17 depicts example systems, servers, and related hardware for enabling a vehicle element control application to carry out the functions described herein, in accordance with some embodiments of this disclosure. An interface equipment device utilizing at least some of the system features described above in connection with FIG. 16 may not be classified solely as vehicle interface equipment 1714, vehicle computer equipment 1716 (e.g., backend processing equipment), or a wireless user communications device 1722. For example, vehicle interface equipment 1714, like some vehicle computer equipment 1716, are Internet-enabled, allowing for access to Internet content. In one example, the vehicle interface equipment 1714 includes the user input interface 1602 discussed in relation to FIG. 16. In some implementations, the vehicle element control application has the same layout on various types of user equipment or is tailored to the display capabilities of the interface equipment. For example, on wireless user communications device 1722, the vehicle element control application is provided as a website accessed by a web browser. In another example, the vehicle element control application is scaled down for wireless user communications devices 1722.

In some embodiments, the interface equipment devices is coupled to communications network 1710 (or, e.g., communications network 1214 in FIG. 12). In some implementations, communications network 1710 is one or more networks including the Internet, a mobile phone network, mobile voice, or data network (e.g., a 4G, 5G, 6G, or LTE network), or other types of communications network (e.g., Bluetooth® and Wi-Fi) or combinations of communications networks.

In some embodiments, system 1700 includes content source 1702 and vehicle element control application data source 1704 coupled to communications network 1710. In some embodiments, communications with the content source 1702 and the vehicle element control application data source 1704 are exchanged over one or more communications paths but are shown as a single path in FIG. 17 to avoid overcomplicating the drawing. Although communications between sources 1702 and 1704 with user equipment devices 1714, 1716, and 1722 are shown through communications network 1710, in some embodiments, sources 1702 and 1704 communicate directly with user equipment devices 1714, 1716, and 1722.

In some embodiments, content source 1702 includes one or more types of content distribution equipment including a data storage facility, programming sources, intermediate distribution facilities and/or servers, Internet providers, on-demand media servers, and other content providers. In some implementations, vehicle element control application data source 1704 provides data from a user input interface (e.g., user interface 110 in FIG. 1A, user interface 504 in FIGS. 5 and 12-14, and user input interface 1602 in FIG. 16), which may include data from sensors (e.g., sensors 108 and 1608 in FIGS. 1A and 16), or a list of actions to control a vehicle (e.g., vehicle 102 in FIGS. 1A-4 and 8A-9C). In one example, vehicle element control application data is provided to the interface equipment devices using any suitable approach. In some embodiments, vehicle element control application data from the vehicle element control application data source 1704 is provided to the interface equipment using a client/server approach. For example, an interface equipment device pulls data from a server, or a server presents the data to an interface equipment device.

The embodiments discussed above are intended to be illustrative and not limiting. One skilled in the art would appreciate that individual aspects of the apparatus and methods discussed herein may be omitted, modified, combined, and/or rearranged without departing from the scope of the disclosure. Only the claims that follow are meant to set bounds as to what the present disclosure includes.

What is claimed is:

1. A method, comprising:
- receiving, by control circuitry of a vehicle, a user interface request to initiate parking in easy access mode;
- in response to the request to initiate parking in easy access mode:
  - identifying a location of a parking spot;
  - identifying a side of the vehicle from which at least one passenger will exit;
  - identifying, using at least one sensor of the vehicle, an exit obstruction that is located adjacent to the location of the parking spot and on a side of the parking spot corresponding to the identified side of the vehicle;
- in response to the identifying the exit obstruction:
  - automatically driving the vehicle into the parking spot such that the vehicle is positioned, in the parking spot, at least a first distance away from the exit obstruction; and
- in response to determining that the at least one passenger has exited and moved away from the vehicle:
  - automatically repositioning the vehicle such that the vehicle is positioned in the parking spot at a second distance away from the exit obstruction, wherein the second distance is less than the first distance.

2. The method of claim 1, wherein the identifying a side of the vehicle from which at least one passenger will exit comprises at least one of:
- receiving a user interface input indicating the identified side of the vehicle; or
- automatically detecting, using an occupancy sensor, a presence of the at least one passenger on the identified side of the vehicle.

3. The method of claim 1, wherein:
- the at least one passenger is a child in a car seat of the vehicle; and
- the first distance is a distance required for a vehicle door to open to allow the child to be unloaded from the car seat.

4. The method of claim 1, wherein the determining that the at least one passenger has exited and moved away from the vehicle comprises at least one of:
- receiving a user interface input indicating the at least one passenger has moved away from the vehicle; or
- automatically detecting, using the at least one sensor, the at least one passenger has moved at least a safety distance away from the vehicle.

5. The method of claim 1, wherein:
- the at least one sensor comprises a first sensor and a second sensor;
- the first sensor is used to identify the exit obstruction; and
- the identifying a location of a parking spot comprises at least one of:
  - receiving a user interface input indicating the location of the parking spot; or
  - automatically detecting, using the second sensor, the location of the parking spot.

6. The method of claim 1, wherein the identifying the exit obstruction further comprises receiving a user interface input confirming the location of the exit obstruction.

7. The method of claim 1, wherein the exit obstruction comprises a first exit obstruction, the method further comprising:

receiving, by the control circuitry of the vehicle, a user interface request to initiate loading in easy access mode;

in response to the request to initiate loading in easy access mode:

identifying a side of the vehicle from which the at least one passenger will enter; and identifying, using the at least one sensor of the vehicle, a second exit obstruction that is located adjacent to the location of the parking spot and on a side of the parking spot corresponding to the identified side of the vehicle from which the at least one passenger will enter; and in response to the identifying the second exit obstruction and to determining that the at least one passenger is located away from the vehicle:

automatically repositioning the vehicle such that the vehicle is positioned, in the parking spot, at least a third distance away from the second exit obstruction, wherein the second distance is less than the third distance.

8. The method of claim 1, wherein:

the vehicle is a first vehicle and the parking spot is a first parking spot;

the exit obstruction is a second vehicle positioned in a second parking spot adjacent to a first side of the first parking spot; and the method further comprises:

communicating, with a third vehicle, to coordinate positioning the first vehicle in the first parking spot at least a third distance away from the third vehicle, wherein:

the third vehicle is parked in a third parking spot that is adjacent to a second side of the first parking spot, the second side opposite the first side; and the third distance is less than the second distance; and receiving, from the third vehicle, a communication indicating the third vehicle has modified security features to allow the first vehicle to be positioned at least the third distance away from the third vehicle.

9. The method of claim 1, further comprising:

in response to the request to initiate parking in easy access mode, identifying an open parking spot on a side of the parking spot opposite the side corresponding to the exit obstruction, wherein:

the automatically driving the vehicle into the parking spot comprises positioning a rear of the vehicle in the front of the parking spot; and the automatically repositioning the vehicle such that the vehicle is positioned in the parking spot comprises positioning a front of the vehicle in the front of the parking spot.

10. The method of claim 1, wherein:

the at least one passenger is a first passenger;

the side of the vehicle from which the first passenger will exit is a first side; and the method further comprises:

identifying a second side of the vehicle from which a second passenger will exit, wherein the second side is opposite the first side; and in response to determining that the first passenger has exited and moved away from the vehicle:

automatically repositioning the vehicle such that the vehicle is positioned in the parking spot at a third distance away from the exit obstruction, wherein the second distance is greater than the third distance.

11. A system, comprising:

at least one sensor of a vehicle;

input/output circuitry configured to:

receive a user interface request to initiate parking in easy access mode; and control circuitry configured to:

in response to the request to initiate parking in easy access mode:

identify a location of a parking spot;

identify a side of the vehicle from which at least one passenger will exit;

identify, using the at least one sensor of the vehicle, an exit obstruction that is located adjacent to the location of the parking spot and on a side of the parking spot corresponding to the identified side of the vehicle;

in response to identifying the exit obstruction:

automatically drive the vehicle into the parking spot such that the vehicle is positioned, in the parking spot, at least a first distance away from the exit obstruction; and in response to determining that the at least one passenger has exited and moved away from the vehicle:

automatically reposition the vehicle such that the vehicle is positioned in the parking spot at a second distance away from the exit obstruction, wherein the second distance is less than the first distance.

12. The system of claim 11, wherein the control circuitry is configured to identify a side of the vehicle from which at least one passenger will exit by at least one of:

receiving a user interface input indicating the identified side of the vehicle; or automatically detecting, using an occupancy sensor, a presence of the at least one passenger on the identified side of the vehicle.

13. The system of claim 11, wherein:

the at least one passenger is a child in a car seat of the vehicle; and the first distance is a distance required for a vehicle door to open to allow the child to be unloaded from the car seat.

14. The system of claim 11, wherein the control circuitry is configured to determine that the at least one passenger has exited and moved away from the vehicle by at least one of:

receiving, via the input/output circuitry, a user interface input indicating the at least one passenger has moved away from the vehicle; or automatically detecting, using the at least one sensor, the at least one passenger has moved at least a safety distance away from the vehicle.

15. The system of claim 11, wherein:

the at least one sensor comprises a first sensor and a second sensor;

the first sensor is used to identify the exit obstruction; and the control circuitry is configured to identify a location of a parking spot by at least one of:

receiving, via the input/output circuitry, a user interface input indicating the location of the parking spot; or automatically detecting, using the second sensor, the location of the parking spot.

16. The system of claim 11, wherein the control circuitry is configured to identify the exit obstruction by receiving a user interface input confirming the location of the exit obstruction.

17. The system of claim 11, wherein:
the exit obstruction comprises a first exit obstruction;
the input/output circuitry is further configured to:
receive a user interface request to initiate loading in easy access mode; and
the control circuitry is further configured to:
in response to the request to initiate loading in easy access mode:
identify a side of the vehicle from which the at least one passenger will enter; and
identify, using the at least one sensor of the vehicle, a second exit obstruction that is located adjacent to the location of the parking spot and on a side of the parking spot corresponding to the identified side of the vehicle from which the at least one passenger will enter; and
in response to identifying the second exit obstruction and to determining that the at least one passenger is located away from the vehicle:
automatically reposition the vehicle such that the vehicle is positioned, in the parking spot, at least a third distance away from the second exit obstruction, wherein the second distance is less than the third distance.

18. The system of claim 11, wherein:
the vehicle is a first vehicle and the parking spot is a first parking spot;
the exit obstruction is a second vehicle positioned in a second parking spot adjacent to a first side of the first parking spot;
the control circuitry is further configured to:
communicate, with a third vehicle, to coordinate positioning the first vehicle in the first parking spot at least a third distance away from the third vehicle, wherein:
the third vehicle is parked in a third parking spot that is adjacent to a second side of the first parking spot, the second side opposite the first side; and
the third distance is less than the second distance; and
the input/output circuitry is further configured to:
receive, from the third vehicle, a communication indicating the third vehicle has modified security features to allow the first vehicle to be positioned at least the third distance away from the third vehicle.

19. The system of claim 11, wherein the control circuitry is further configured to:
in response to the request to initiate parking in easy access mode, identify an open parking spot on a side of the parking spot opposite the side corresponding to the exit obstruction;
automatically drive the vehicle into the parking spot by positioning a rear of the vehicle in the front of the parking spot; and
automatically reposition the vehicle such that the vehicle is positioned in the parking spot by positioning a front of the vehicle in the front of the parking spot.

20. The system of claim 11, wherein:
the at least one passenger is a first passenger;
the side of the vehicle from which the first passenger will exit is a first side; and
the control circuitry is further configured to:
identify a second side of the vehicle from which a second passenger will exit, wherein the second side is opposite the first side; and
in response to determining that the first passenger has exited and moved away from the vehicle:
automatically reposition the vehicle such that the vehicle is positioned in the parking spot at a third distance away from the exit obstruction, wherein the second distance is greater than the third distance.

* * * * *